(12) United States Patent
Lee

(10) Patent No.: US 12,587,079 B2
(45) Date of Patent: Mar. 24, 2026

(54) ACTUATOR DEVICE

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 308 days.

(21) Appl. No.: 18/562,544

(22) PCT Filed: May 13, 2022

(86) PCT No.: PCT/KR2022/006882
§ 371 (c)(1),
(2) Date: Nov. 20, 2023

(87) PCT Pub. No.: WO2022/245055
PCT Pub. Date: Nov. 24, 2022

(65) Prior Publication Data
US 2024/0243647 A1 Jul. 18, 2024

(30) Foreign Application Priority Data

May 21, 2021 (KR) ........................ 10-2021-0065809

(51) Int. Cl.
*H02K 33/18* (2006.01)
*H04N 23/12* (2023.01)
(Continued)

(52) U.S. Cl.
CPC ............. *H02K 33/18* (2013.01); *H04N 23/12* (2023.01); *H04N 23/51* (2023.01); *H04N 23/55* (2023.01)

(58) Field of Classification Search
CPC .... H02K 33/18; H02K 2201/18; H04N 23/12; H04N 23/51; H04N 23/55; H04N 23/54;
(Continued)

(56) References Cited

U.S. PATENT DOCUMENTS 10,684,464 B2* 6/2020 Aschwanden ....... G02B 26/101
10,830,988 B2* 11/2020 Krylov ................... G02B 7/003
(Continued)

FOREIGN PATENT DOCUMENTS

KR 10-1942743 B1 1/2019
KR 10-2020-0085579 A 7/2020
(Continued)

OTHER PUBLICATIONS

International Search Report dated Aug. 26, 2022 in International Application No. PCT/KR2022/006882.
(Continued)

*Primary Examiner* — Tulsidas C Patel
*Assistant Examiner* — Mohammed Ahmed Qureshi
(74) *Attorney, Agent, or Firm* — Saliwanchik, Lloyd & Eisenschenk

(57) ABSTRACT

An embodiment of the present invention relates to an actuator device comprising: a housing; a holder which is disposed in the housing; a reflective member which is disposed in the holder; a first drive unit which tilts the holder about a first axis; a first attractive member which is disposed in the holder; and a second attractive member which is disposed in the housing and has attraction with the first attractive member, wherein a first imaginary straight line connecting the center of the first attractive member to the center of the second attractive member is spaced apart from a second imaginary straight line passing through the first axis and parallel to the first straight line.

20 Claims, 27 Drawing Sheets

10

3100
1220
3700

(51) Int. Cl.
    *H04N 23/51*          (2023.01)
    *H04N 23/55*          (2023.01)

(58) Field of Classification Search
    CPC ...... H04N 23/57; G02B 7/182; G02B 7/1821;
                      H01F 7/02; H01F 7/0242
    See application file for complete search history.

(56)               References Cited

U.S. PATENT DOCUMENTS

| | | | |
|---|---|---|---|
| 2018/0113277 A1* | 4/2018 | Balaban | .................. H01F 7/081 |
| 2021/0072495 A1 | 3/2021 | Jahwa | |

FOREIGN PATENT DOCUMENTS

| | | |
|---|---|---|
| KR | 10-2021-0013961 A | 2/2021 |
| KR | 10-2021-0013978 A | 2/2021 |
| KR | 10-2021-0041947 A | 4/2021 |
| KR | 10-2021-0047493 A | 4/2021 |

OTHER PUBLICATIONS

Office Action dated Apr. 14, 2025 in Korean Application No. 10-2021-0065809.

Office Action dated Jun. 22, 2025 in Korean Application No. 10-2021-0065809.

* cited by examiner

10

3100

1220

3700

10

3100

3710

3700

2110

1140

<u>10</u>

ACTUATOR DEVICE

CROSS-REFERENCE TO RELATED APPLICATIONS

This application is the U.S. national stage application of International Patent Application No. PCT/KR2022/006882, filed May 13, 2022, which claims the benefit under 35 U.S.C. § 119 of Korean Application No. 10-2021-0065809, filed May 21, 2021, the disclosures of each of which are incorporated herein by reference in their entirety.

TECHNICAL FIELD

The present embodiment relates to an actuator device.

BACKGROUND ART

A camera device is a device that takes a picture or video of a subject and is installed in an optical instrument such as a smartphone, a drone, or a vehicle.

In recent camera devices, in order to improve the quality of images in recent camera devices, optical image stabilization (OIS) function that compensates for image shaking caused by user movement, auto focus (AF) function that automatically adjusts the distance between the image sensor and the lens to align the focal length of the lens, and zoom function that increases or decreases the magnification of a distant subject through a zoom lens are being required

DETAILED DESCRIPTION OF THE INVENTION

Technical Subject

The present embodiment is intended to provide an actuator device in which an OIS function is implemented by tilting a reflective member.

Furthermore, it is intended to provide an actuator device that minimizes magnetic field interference to a lens driving device.

Technical Solution

An actuator device according to this embodiment comprises: a housing; a holder being disposed in the housing; a reflective member being disposed on the holder; a first drive unit that tilts the holder about a first axis; a first attractive member being disposed on the holder; and a second attractive member being disposed on the housing and acting an attractive force with the first attractive member, wherein an imaginary first straight line connecting the center of the first attractive member and the center of the second attractive member may be spaced apart from an imaginary second straight line passing through the first axis and parallel to the first straight line.

Light is incident on an upper surface of the reflective member, and the first straight line may be positioned higher than the second straight line.

The first straight line may be spaced apart from the second straight line in a first direction, and the first straight line may be overlapped with the second straight line in the first direction.

The actuator device may comprise a second drive unit that tilts the holder with respect to a second axis perpendicular to the first axis.

The second axis may be parallel to the first direction.

The center of the first attractive member may be disposed at the same height as the center of the second attractive member.

Each of the first attractive member and the second attractive member may comprise a magnet.

Any one of the first attractive member and the second attractive member may comprise a magnet, and the other may comprise a metal yoke.

The first drive unit comprises a first driving magnet and a first coil, and in an initial state in which no current is applied to the first coil, the holder may be in contact with the housing.

The housing comprises a first portion being disposed above the holder, and in the initial state, the holder may be in contact with the first portion of the housing.

A first direction drive current may be applied to the first coil to tilt the holder, and a second direction drive current opposite to the first direction drive current may not be used to tilt the holder.

The actuator device may comprise a moving plate being disposed between the housing and the holder, the moving plate may comprise a protrusion being disposed in the holder, and the first axis may be formed by the protrusion of the moving plate.

The actuator device comprises a moving plate being disposed between the housing and the holder, the moving plate comprises a hole, the housing comprises a protruding portion being protruded toward the holder and at least a portion of which is disposed in the hole of the moving plate, and the second attractive member may be disposed in the protruding portion of the housing.

A camera device according to the present embodiment may comprise: a printed circuit board; an image sensor being disposed in the printed circuit board; an actuator device; and a lens being disposed in an optical path being formed by the reflective member of the actuator device and the image sensor.

An optical device according to the present embodiment may comprise: a main body; a camera device being disposed in the main body; and a display being disposed in the main body and outputting at least one of a video and an image photographed by the camera device.

The actuator device according to the present embodiment comprises: a housing; a holder being disposed in the housing; a reflective member being disposed on the holder; a first drive unit for tilting the holder about a first axis; a first attractive member being disposed on the holder; and a second attractive member being disposed on the housing and acting an attractive force with the first attractive member, wherein in an initial state in which no current is applied to the first drive unit, the holder may be in contact with the housing.

The housing comprises a first portion being disposed above the holder, and in the initial state, the holder may be in contact with the first portion of the housing.

An imaginary first straight line connecting the center of the first attractive member and the center of the second attractive member may be spaced apart from an imaginary second straight line that passes through the first axis and is parallel to the first straight line.

The first straight line may be spaced apart from the second straight line in a first direction, and the first straight line may be overlapped with the second straight line in the first direction.

The actuator device according to the present embodiment comprises: a housing; a holder being disposed inside the housing; a reflective member being disposed in the holder; a moving plate being disposed between the housing and the holder; a driving magnet and a first coil for tilting the holder about a first axis; a first magnet being disposed in the holder; and a second magnet being disposed in the housing at a position corresponding to the first magnet, wherein a first surface of the first magnet and a first surface of the second magnet face each other and have different polarities, and wherein the imaginary first straight line connecting the center of the first magnet and the center of the second magnet may be spaced apart from an imaginary second straight line passing through the first axis and parallel to the first straight line.

Advantageous Effects

Through the present embodiment, performance failure of first-axis tilt driving can be improved.

Furthermore, the problem of the moving plate being separated and removed when driving the first axis can be fundamentally inhibited. At this time, the first axis is not limited to any one axis in one direction.

More specifically, through the eccentric arrangement of the attraction magnet, only the current in an opposite direction can be used without using a current in a direction that may cause the moving plate to be separated and removed when first axis driving.

In addition, the noise being generated by the moving unit hitting the stationary unit due to the movement of the optical device when not driven can be minimized.

4

Figure 15:
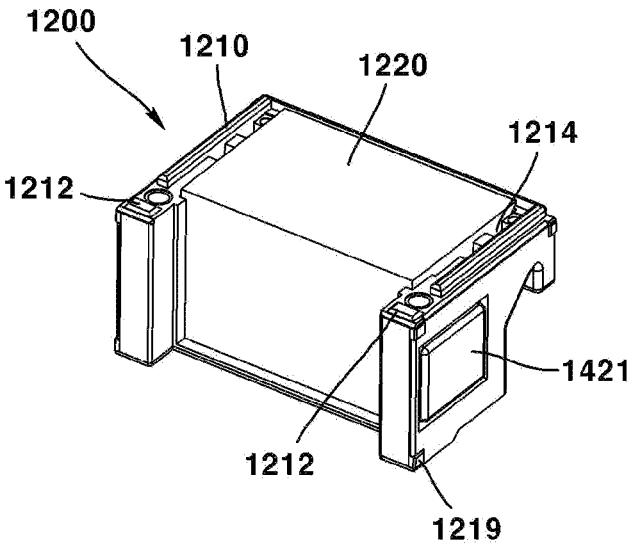
FIG. 15 is a perspective view illustrating a moving unit and related components of a reflective member driving device according to the present embodiment.
Figure 16:
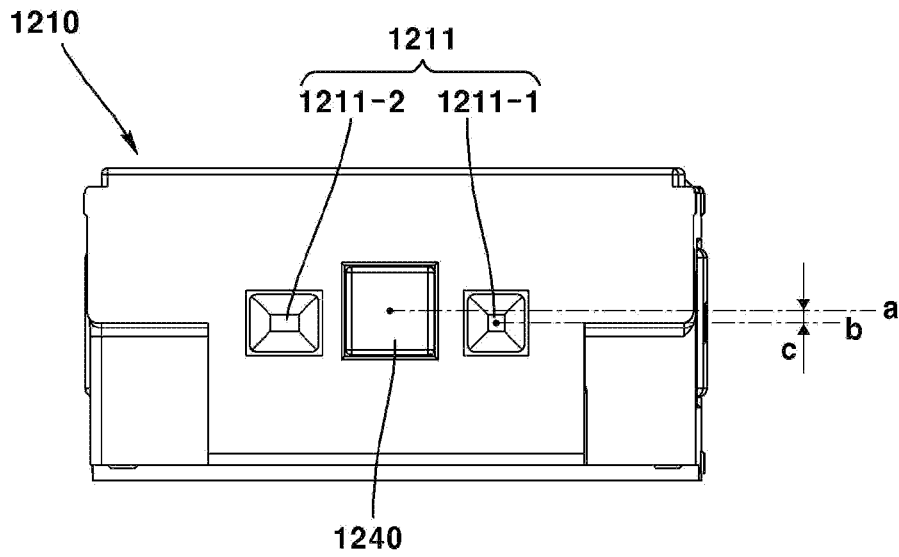

FIG. 16 is a front view of a reflective member driving device in the state of FIG. 15.

Figure 17:
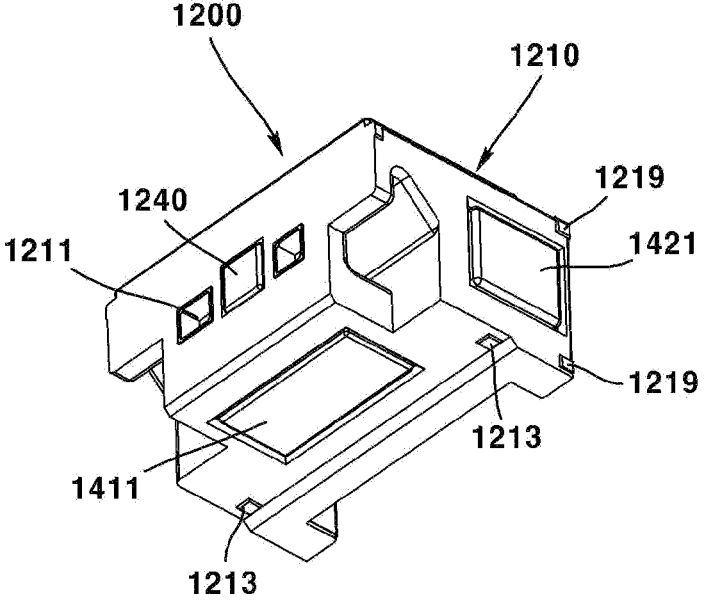

FIG. 17 is a perspective view of a reflective member driving device shown in FIG. 15 when viewed from a different direction than that of FIG. 15.

Figure 18:
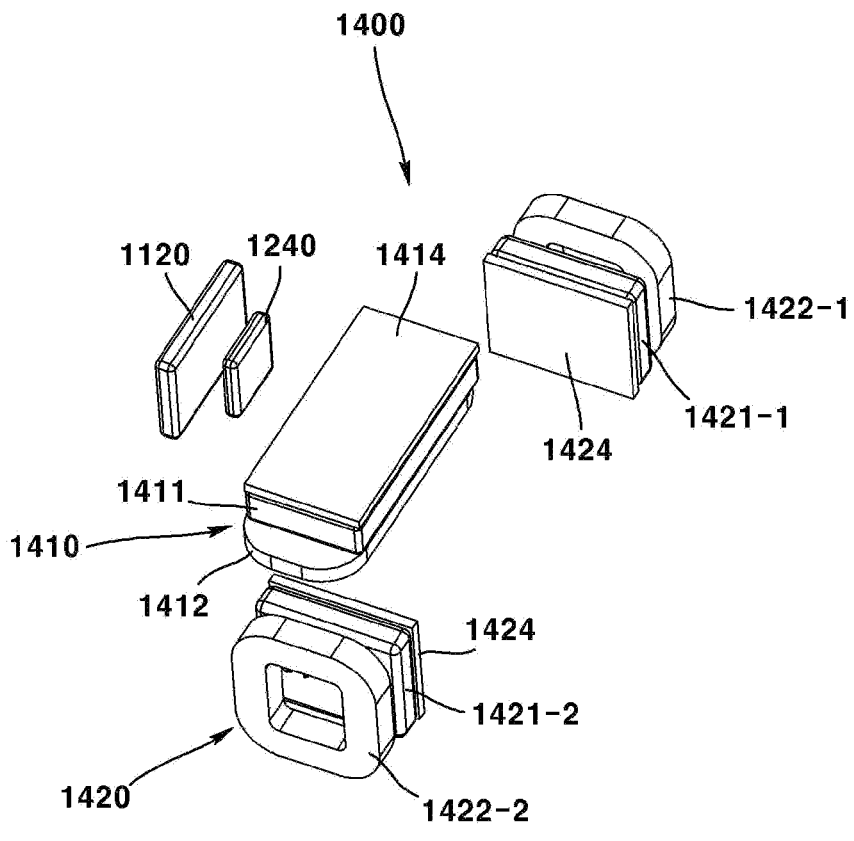

FIG. 18 is a perspective view illustrating a magnet and a coil of a reflective member driving device according to the present embodiment.

Figure 19A:
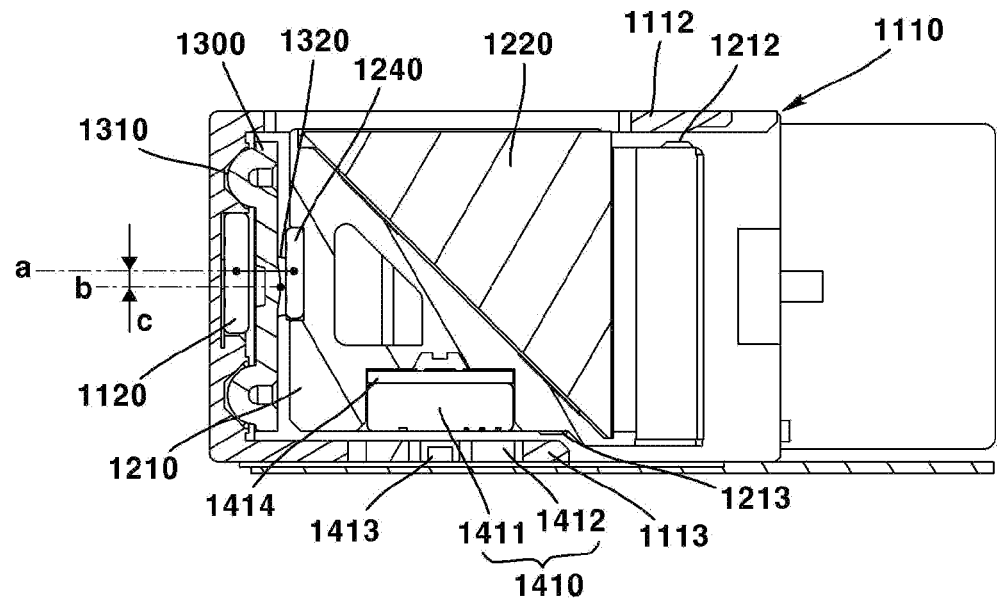

FIG. 19a is a cross-sectional view of a reflective member driving device according to the present embodiment.

Figure 19B:
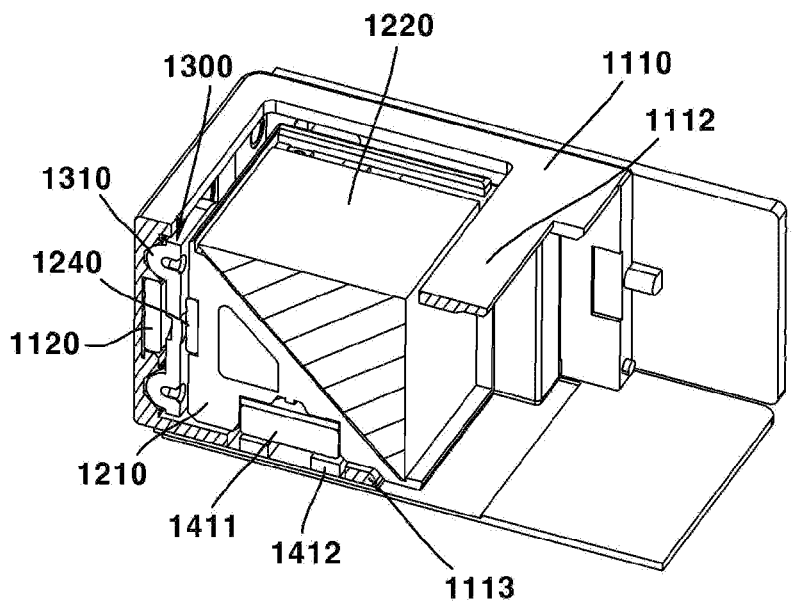

FIG. 19b is a perspective view of the reflective member driving device in the state of FIG. 19a.

Figure 19C:
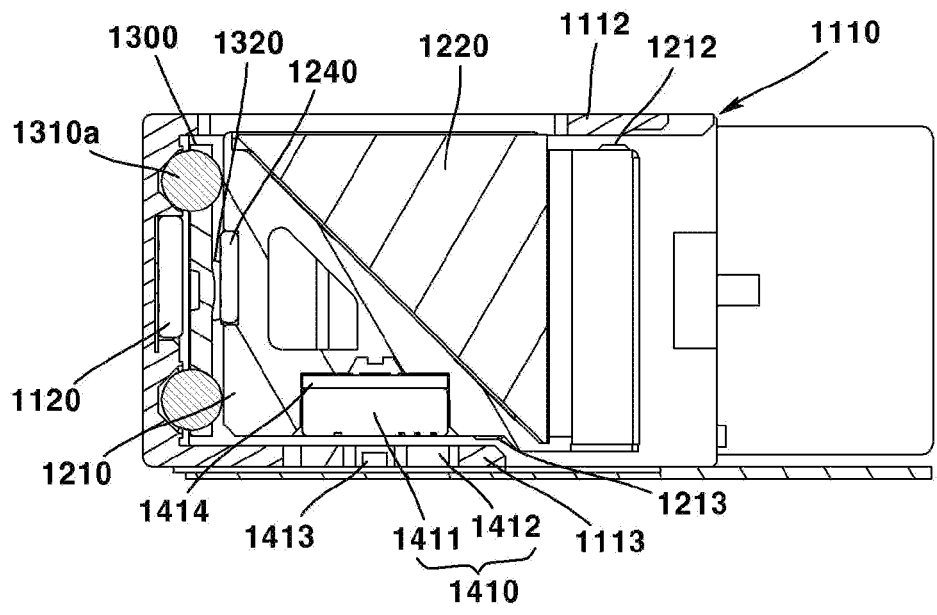

FIG. 19c is a cross-sectional view of a reflective member driving device according to a modified embodiment.

Figure 20:
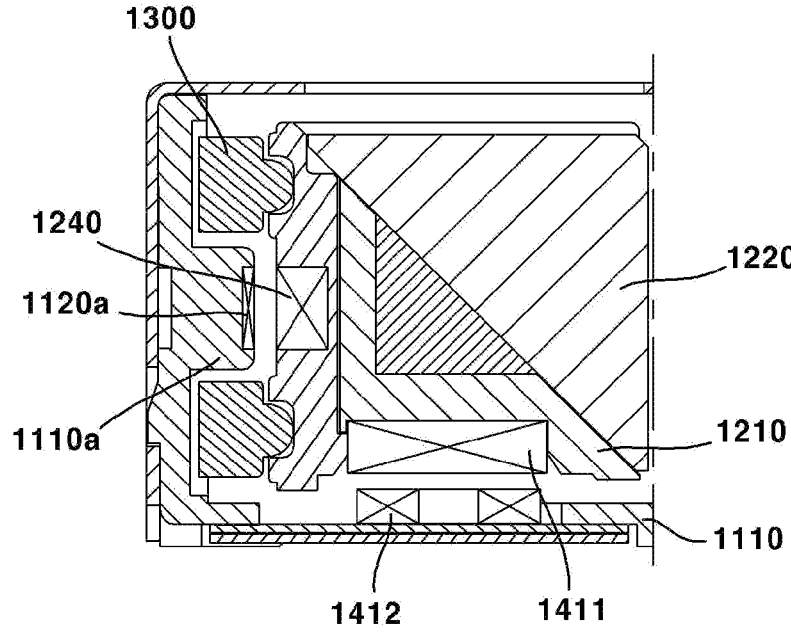

FIG. 20 is a cross-sectional view of a reflective member driving device according to a modified embodiment.

Figure 21:
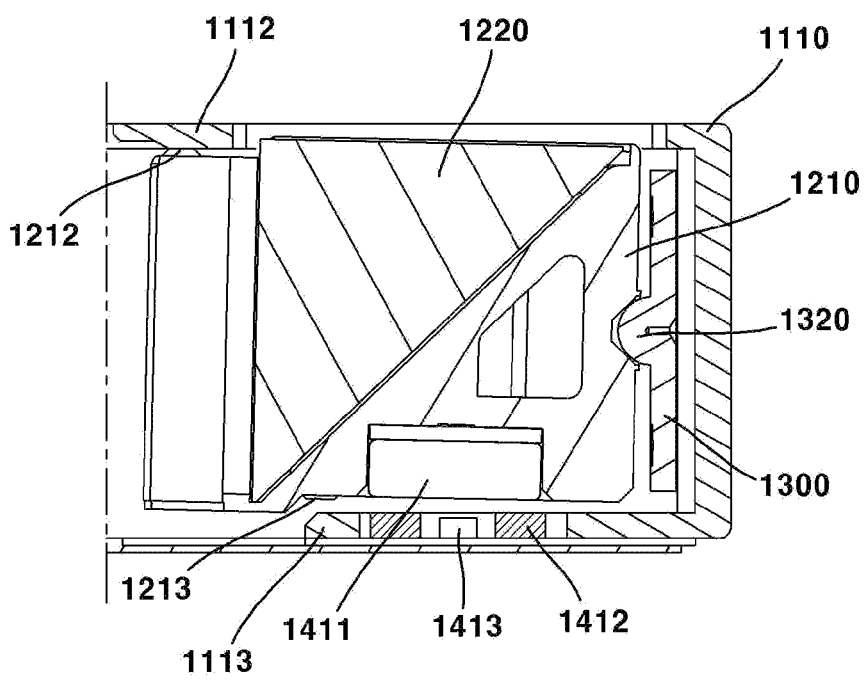
Figure 22:
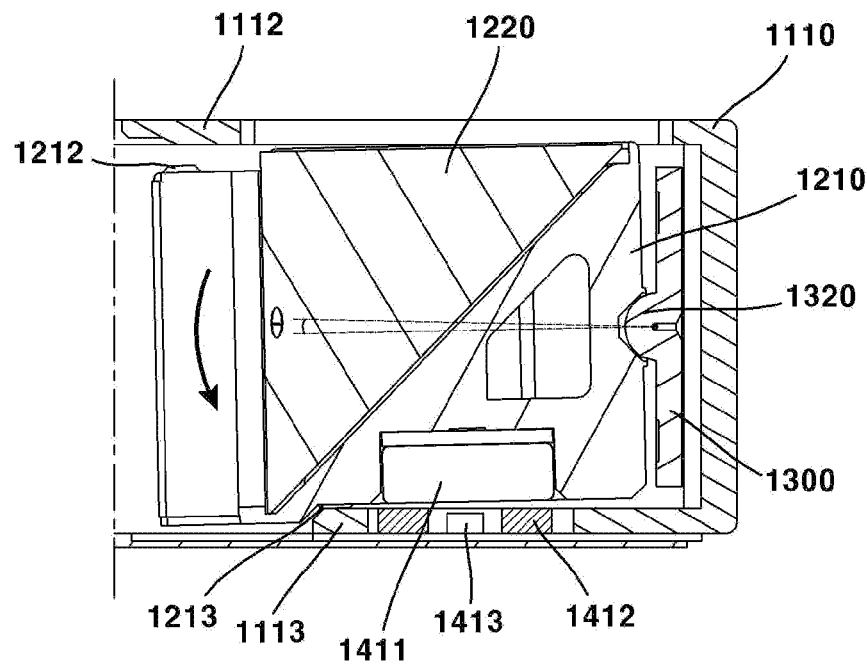

FIGS. 21 and 22 are diagrams for explaining a tilt about an x-axis of a reflective member driving device according to the present embodiment.

Figure 23:
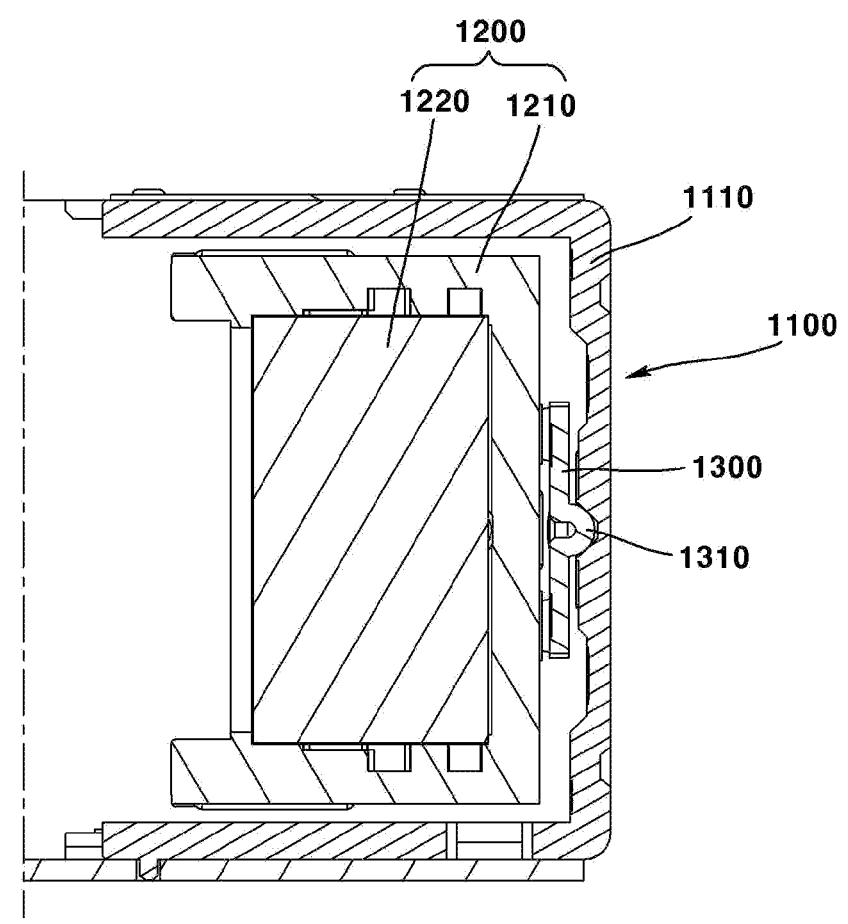
Figure 24:
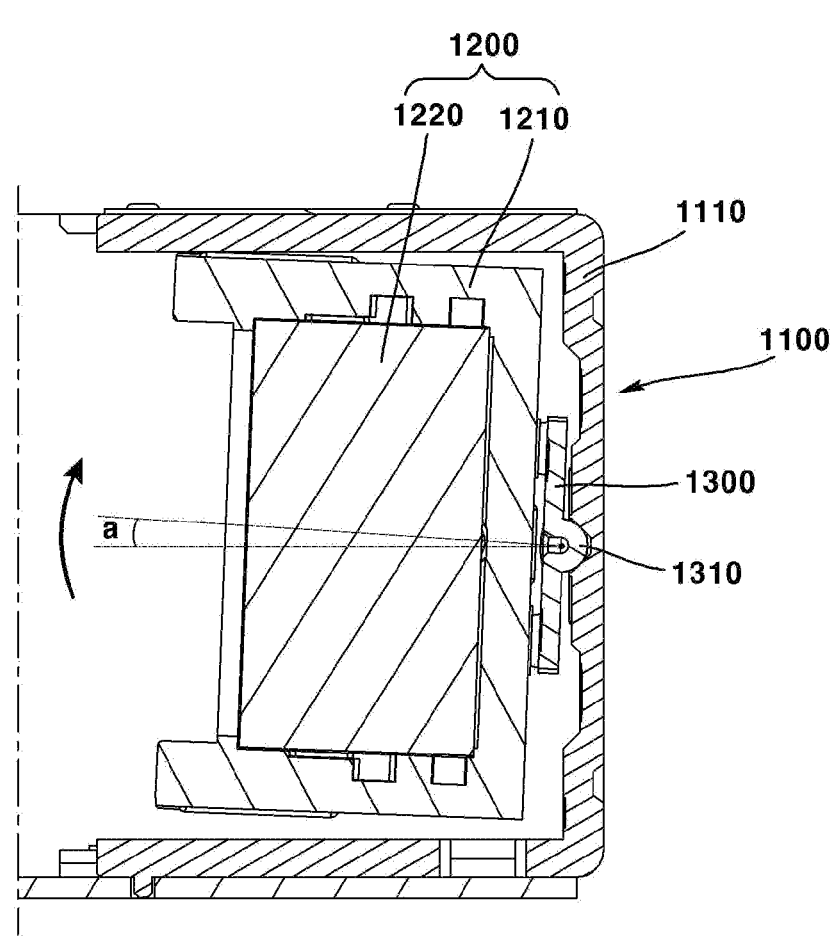
Figure 25:
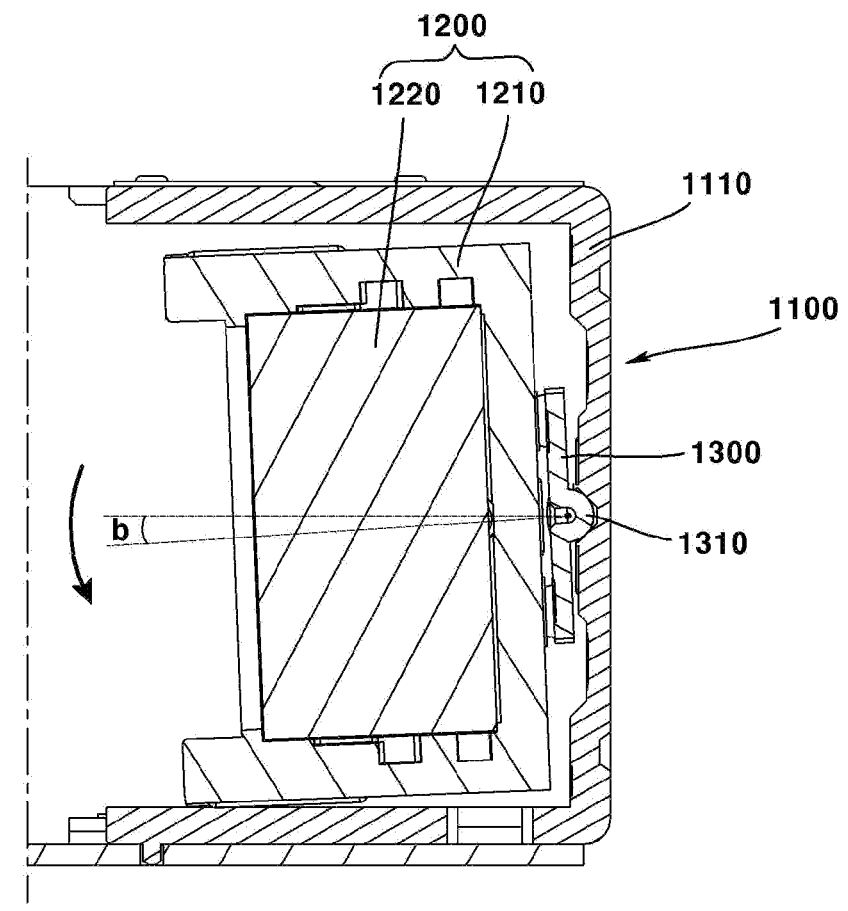

FIGS. 23 to 25 are diagrams for explaining a tilt about a y-axis of a reflective member driving device according to the present embodiment.

Figure 26:
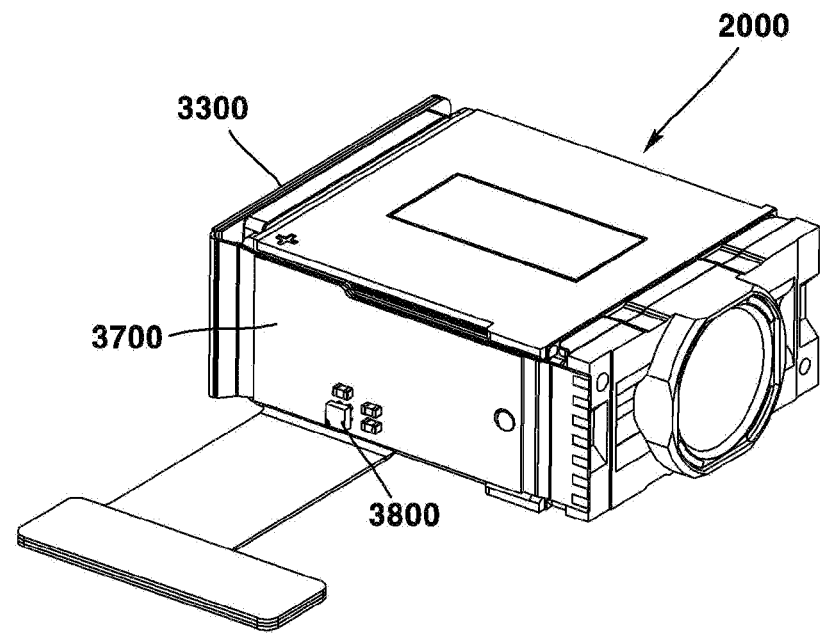

FIG. 26 is a perspective view of a lens driving device according to the present embodiment.

Figure 27:
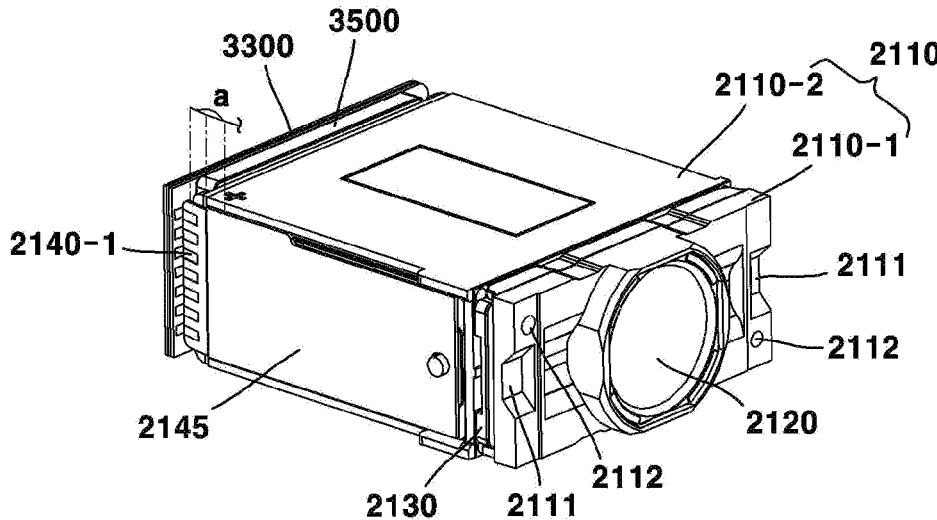

FIG. 27 is a perspective view in which some components of a lens driving device according to the present embodiment are omitted.

Figure 28:
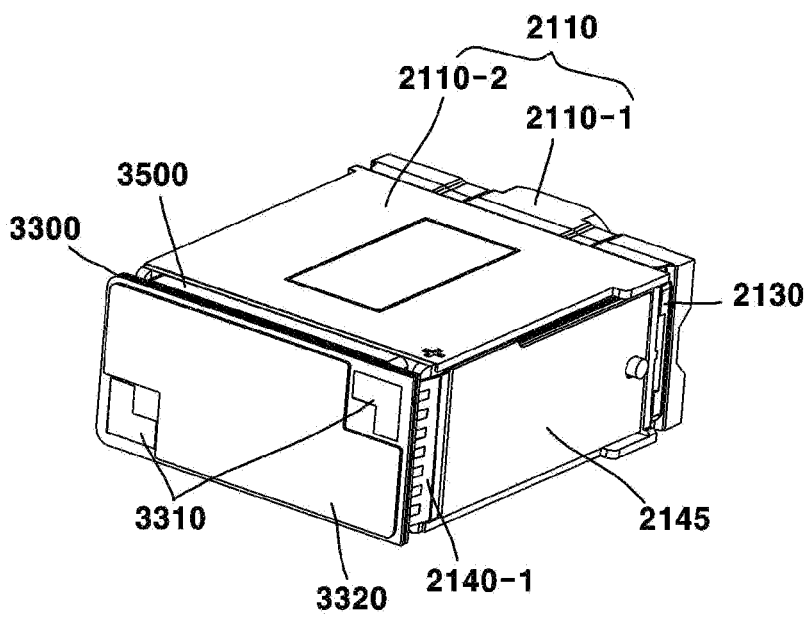

FIG. 28 is a perspective view of a lens driving device illustrated in FIG. 27 when viewed from another direction.

Figure 29:
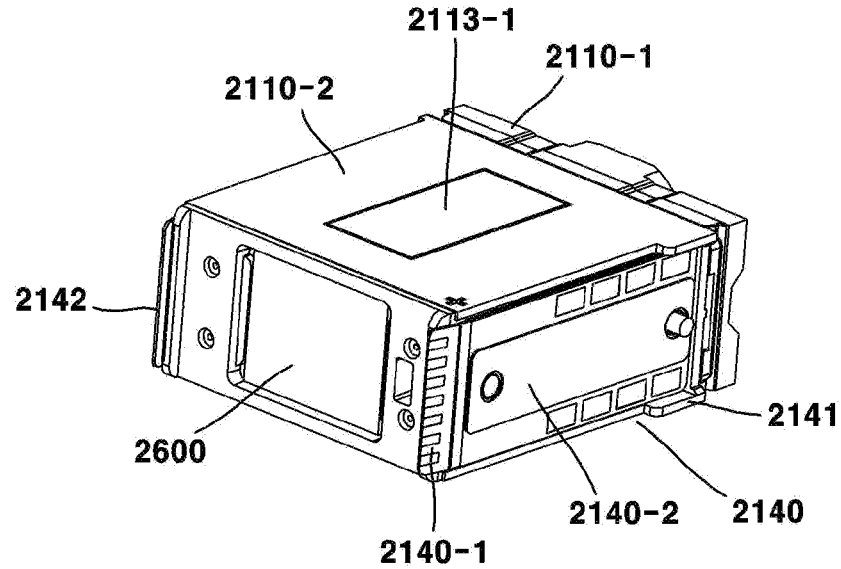

FIG. 29 is a perspective view in which some components of a lens driving device according to the present embodiment are omitted.

Figure 30:
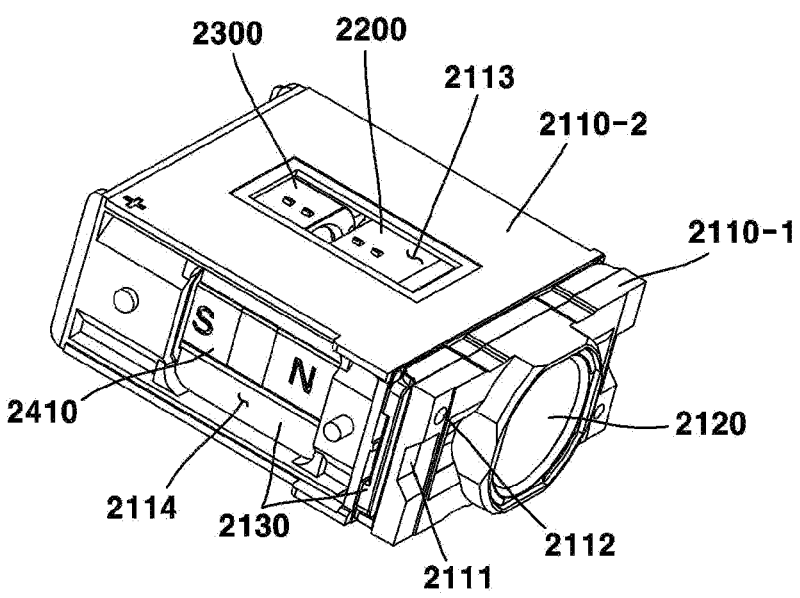

FIG. 30 is a perspective view of a state in which components such as a substrate and a coil are omitted in a lens driving device according to the present embodiment.

Figure 31:
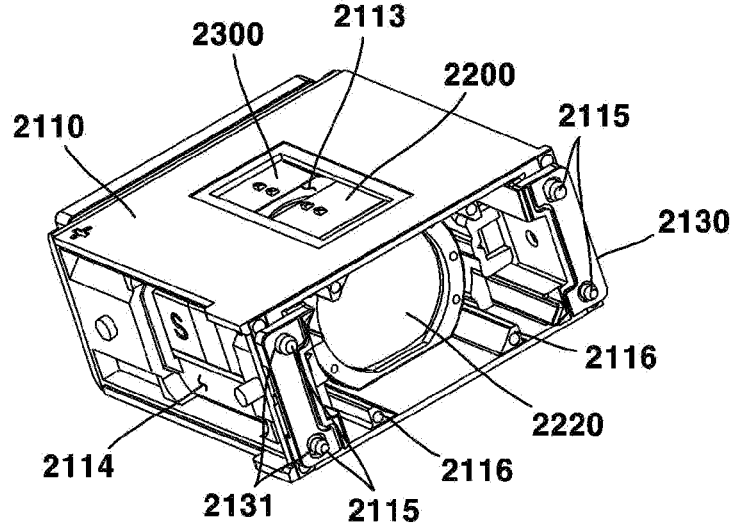

FIG. 31 is a perspective view of a state in which a first lens and related components are omitted from the lens driving device illustrated in FIG. 30.

Figure 32:
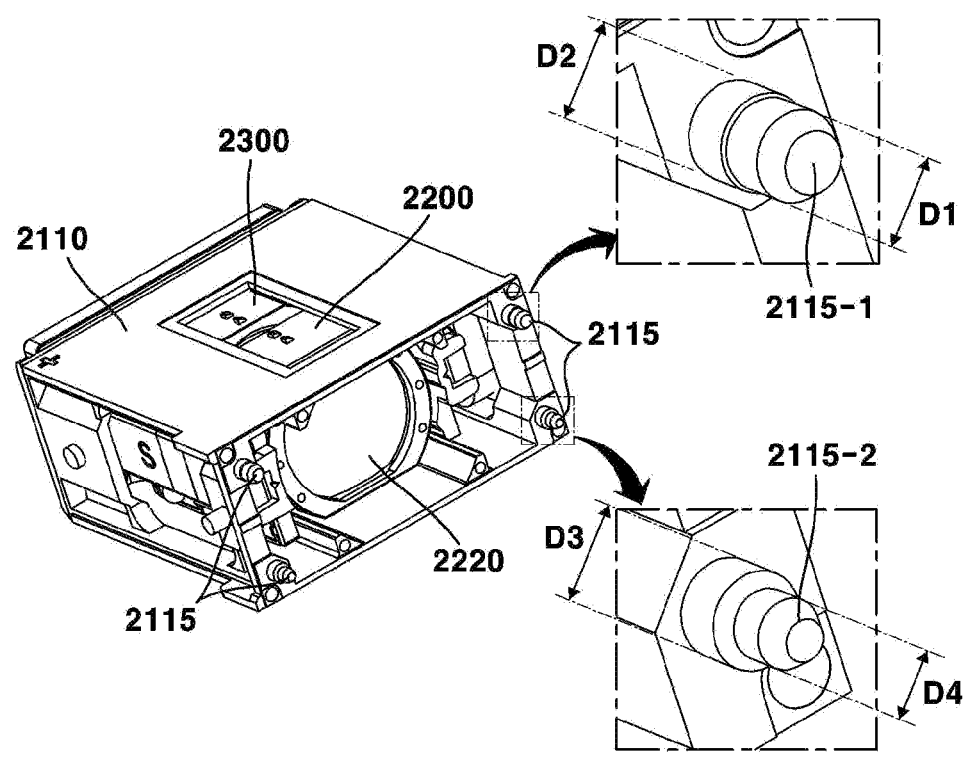

FIG. 32 is a perspective view and a partially enlarged view of some components of a lens driving device according to the present embodiment.

Figure 33:
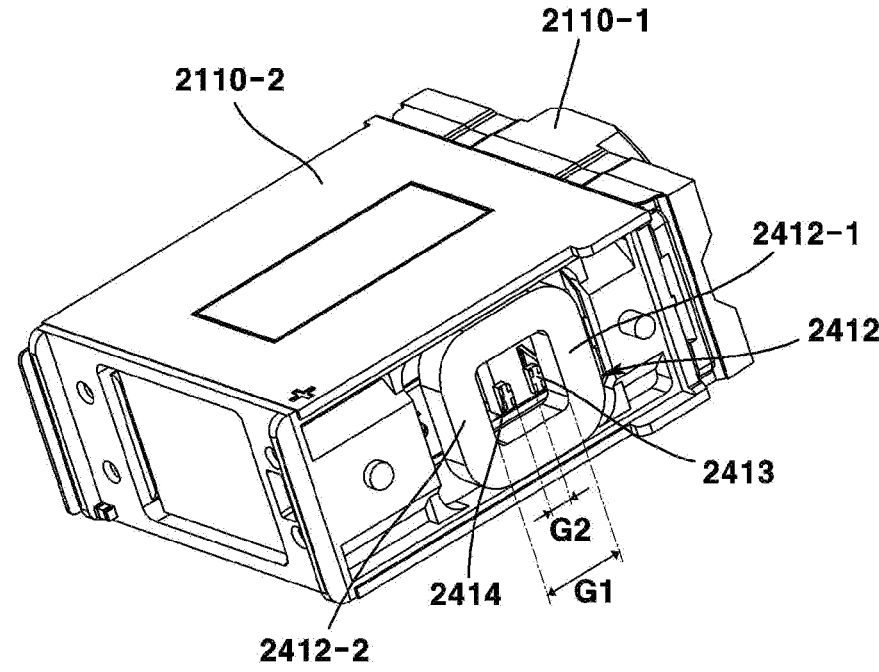

FIG. 33 is a diagram for explaining an arrangement structure of a coil and a sensor of a lens driving device according to the present embodiment.

Figure 34:
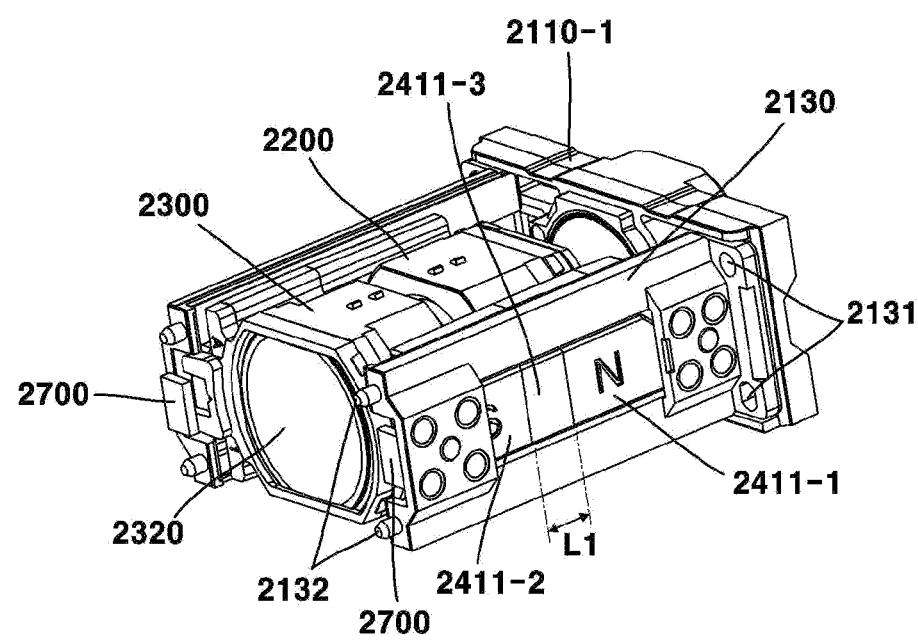

FIG. 34 is a perspective view of a state in which a second housing is omitted from the lens driving device illustrated in FIG. 30.

Figure 35:
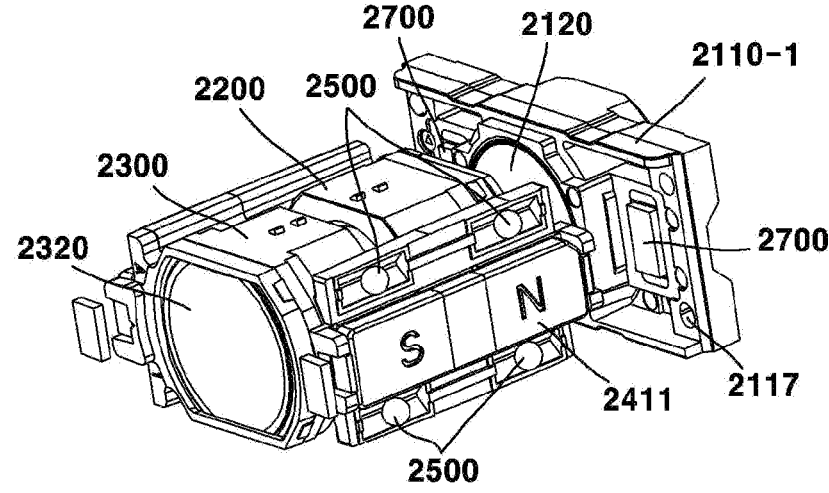

FIG. 35 is a perspective view of a state in which a guide rail is omitted from the lens driving device illustrated in FIG. 34.

Figure 36:
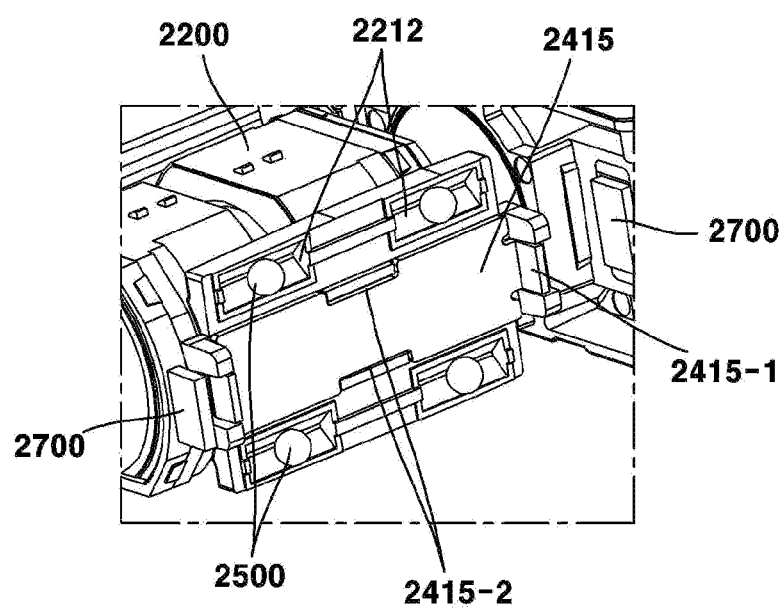

FIG. 36 is an enlarged view of some components of a lens driving device according to the present embodiment.

Figure 37:
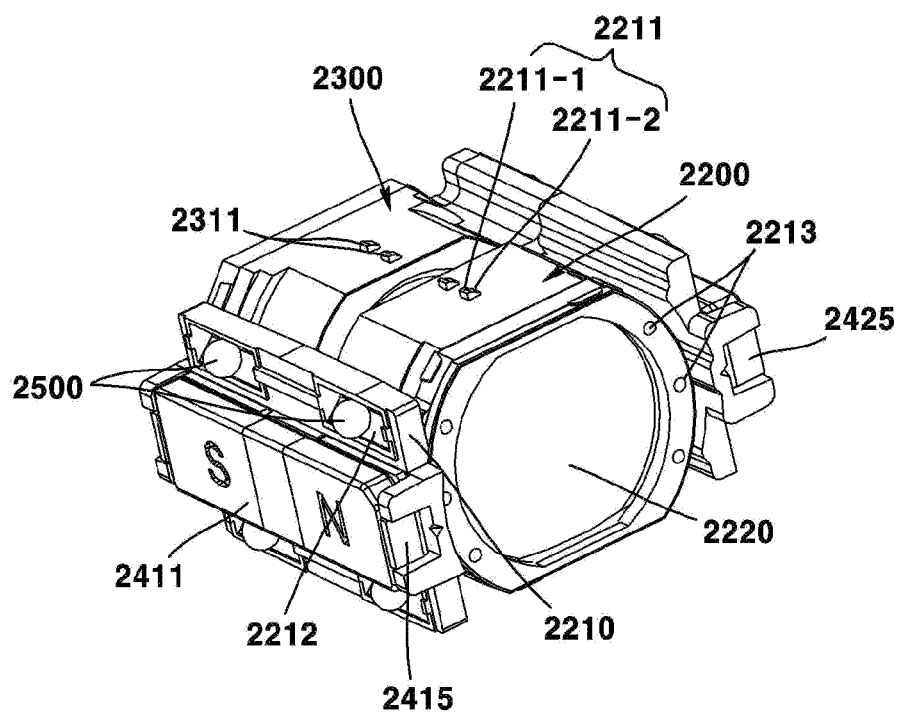

FIG. 37 is a perspective view of a first moving unit and a second moving unit and related components of a lens driving device according to the present embodiment.

Figure 38:
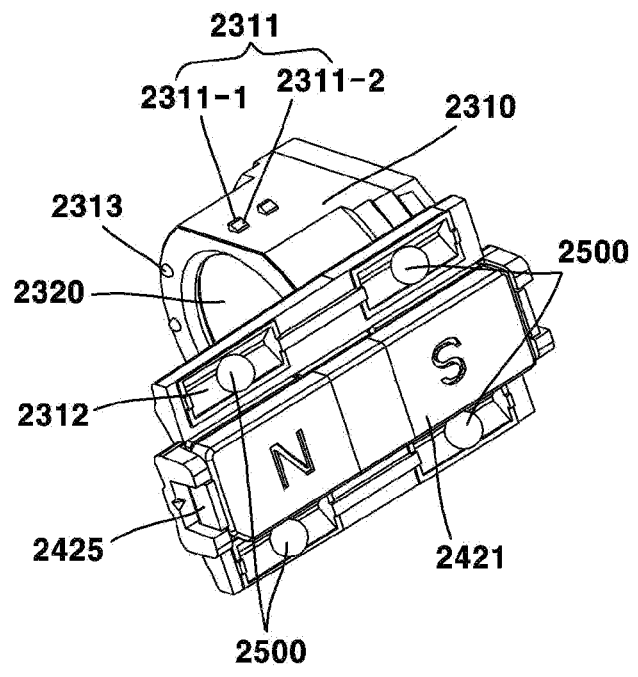

FIG. 38 is a perspective view of a second moving unit and related components of a lens driving device according to the present embodiment.

Figure 39:
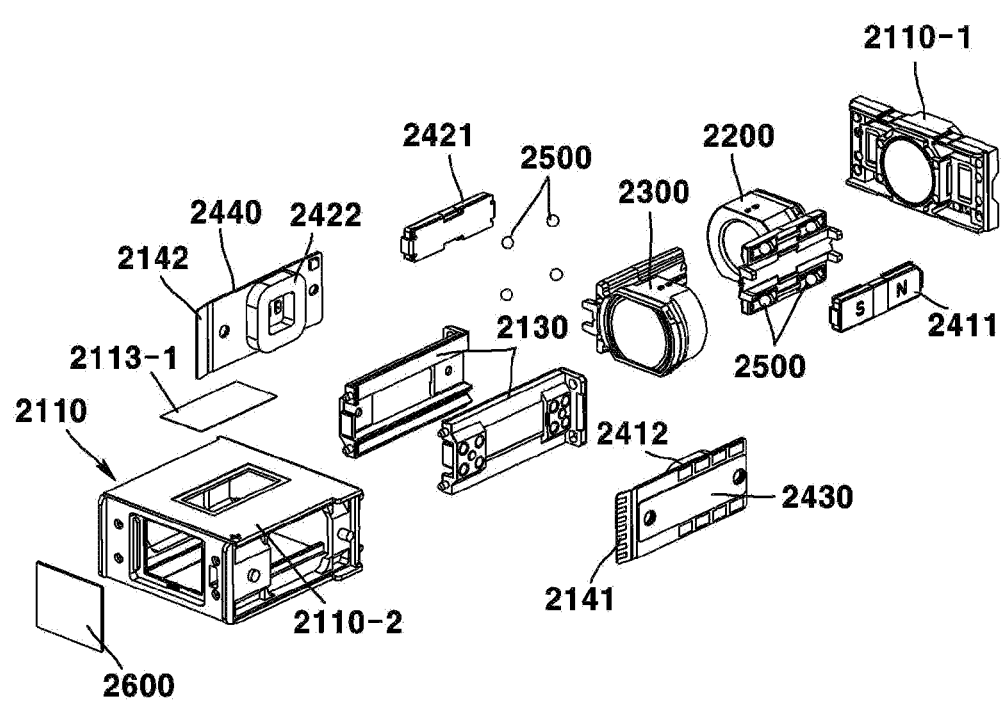

FIG. 39 is an exploded perspective view of a lens driving device according to the present embodiment.

Figure 40:
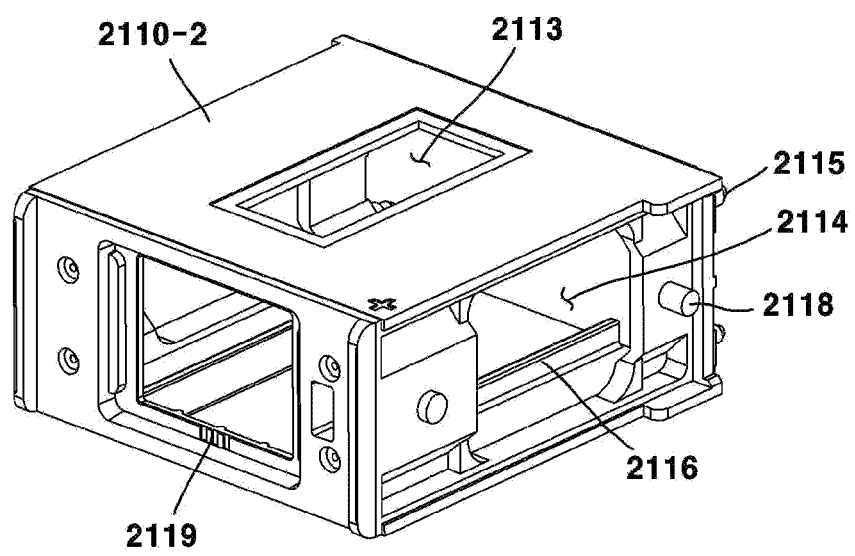

FIG. 40 is a perspective view of a second housing of a lens driving device according to the present embodiment.

Figure 41:
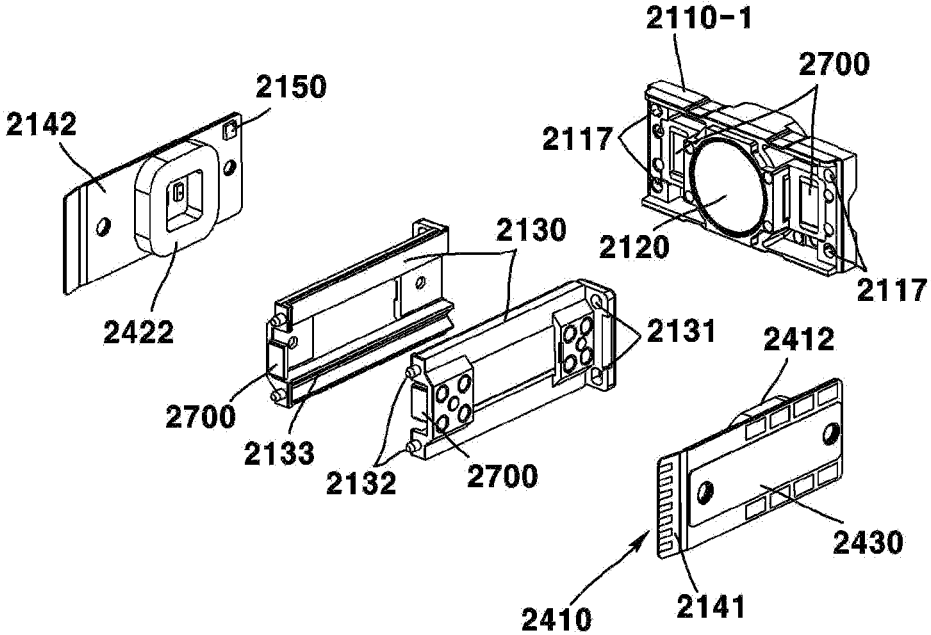
Figure 42:
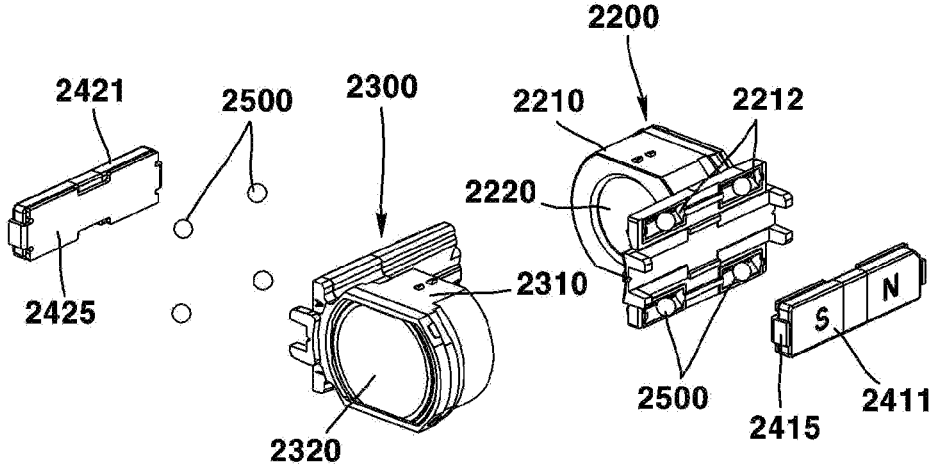

FIGS. 41 and 42 are exploded perspective views of some components of a lens driving device according to the present embodiment.

Figure 43:
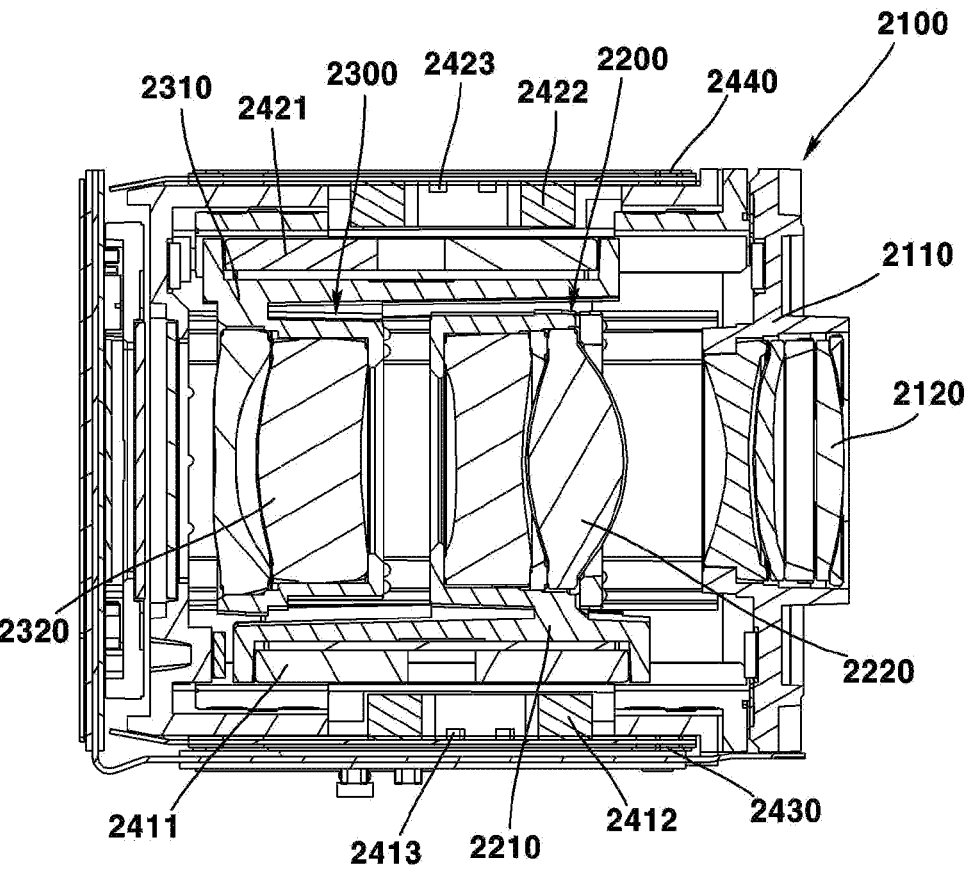

FIG. 43 is a cross-sectional view of a lens driving device according to this embodiment.

Figure 44:
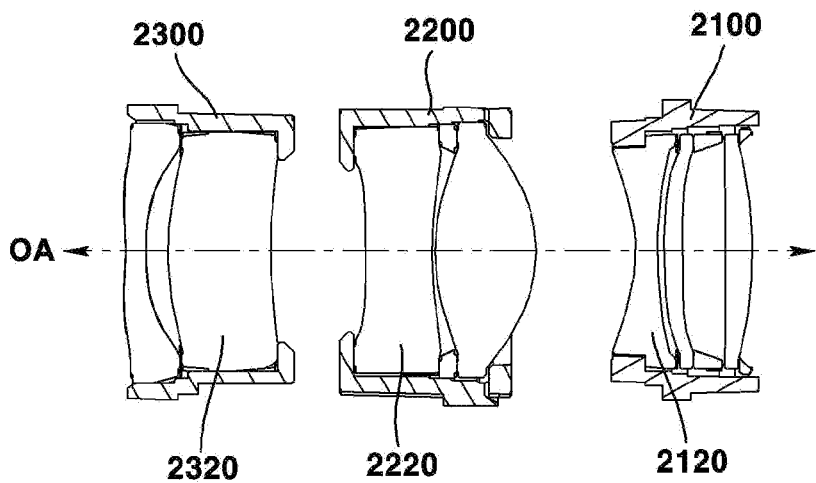
Figure 45:
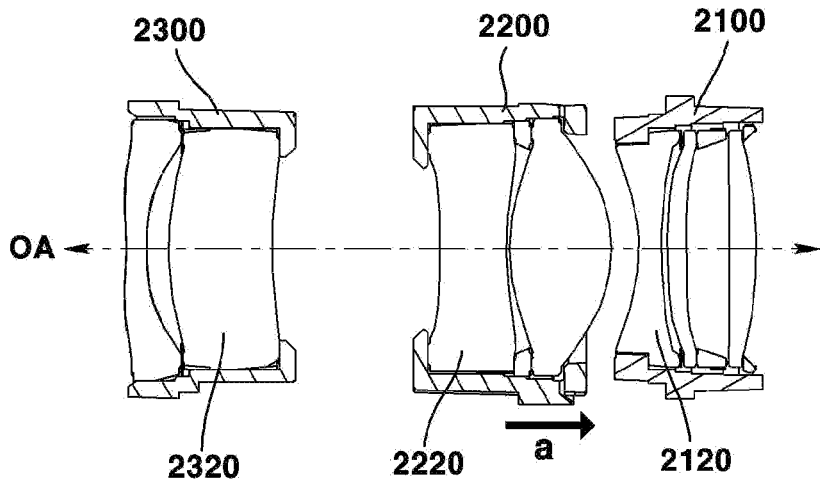
Figure 46:
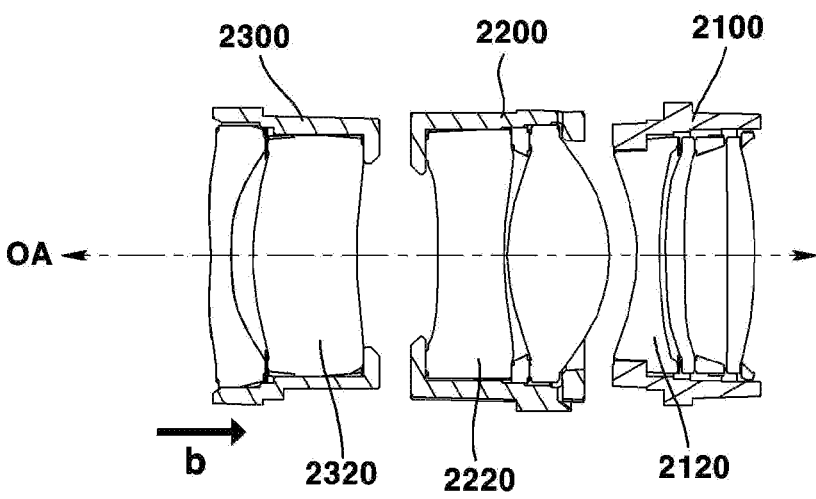

FIGS. 44 to 46 are views for explaining implementation of a zoom function and an autofocus function of a lens driving device according to the present embodiment.

Figure 47:
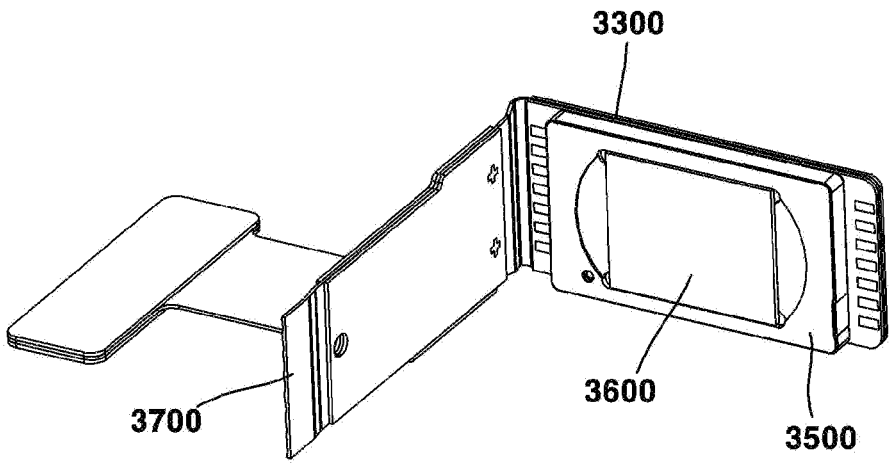

FIG. 47 is a perspective view of some components of a camera device according to the present embodiment.

Figure 48:
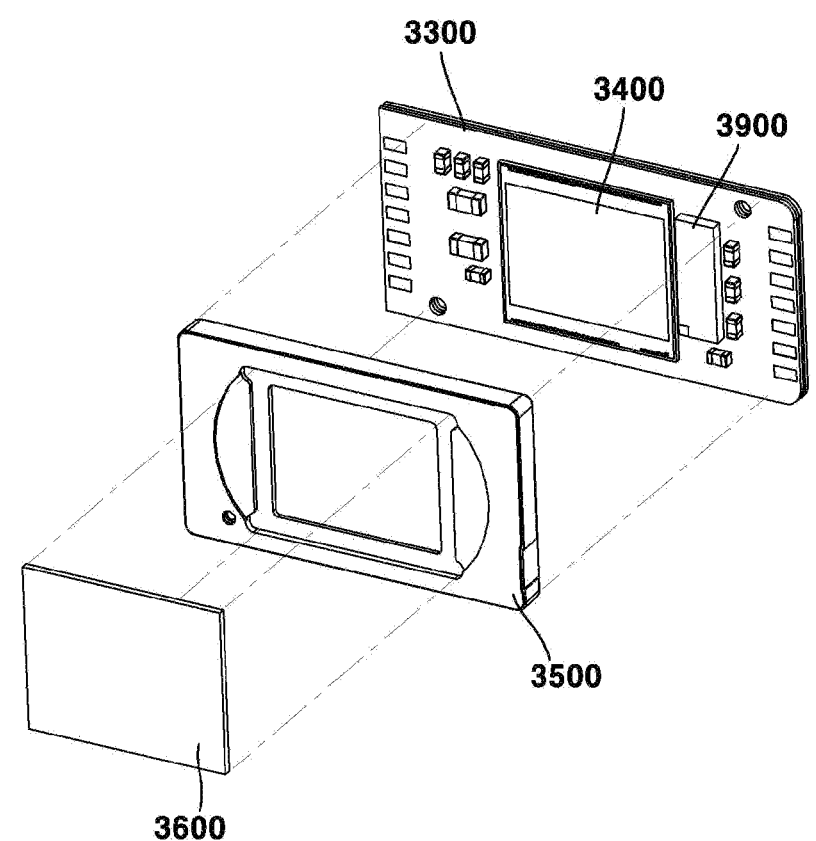

FIG. 48 is an exploded perspective view of an image sensor and a filter and related components of a camera device according to the present embodiment.

Figure 49:
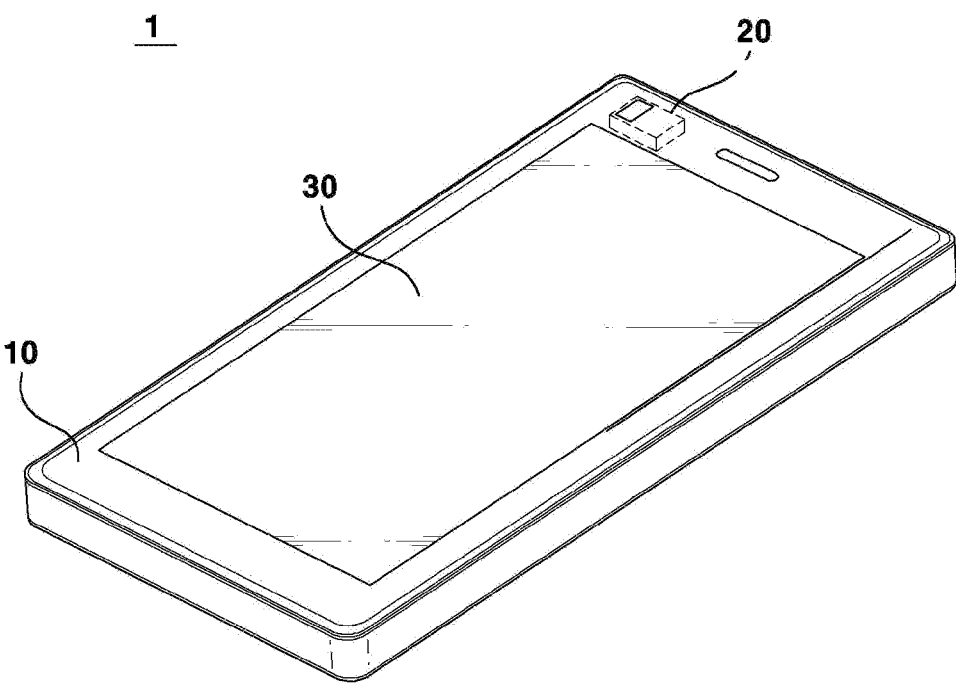

FIG. 49 is a perspective view of the front of the optical device according to the present embodiment.

Figure 50:
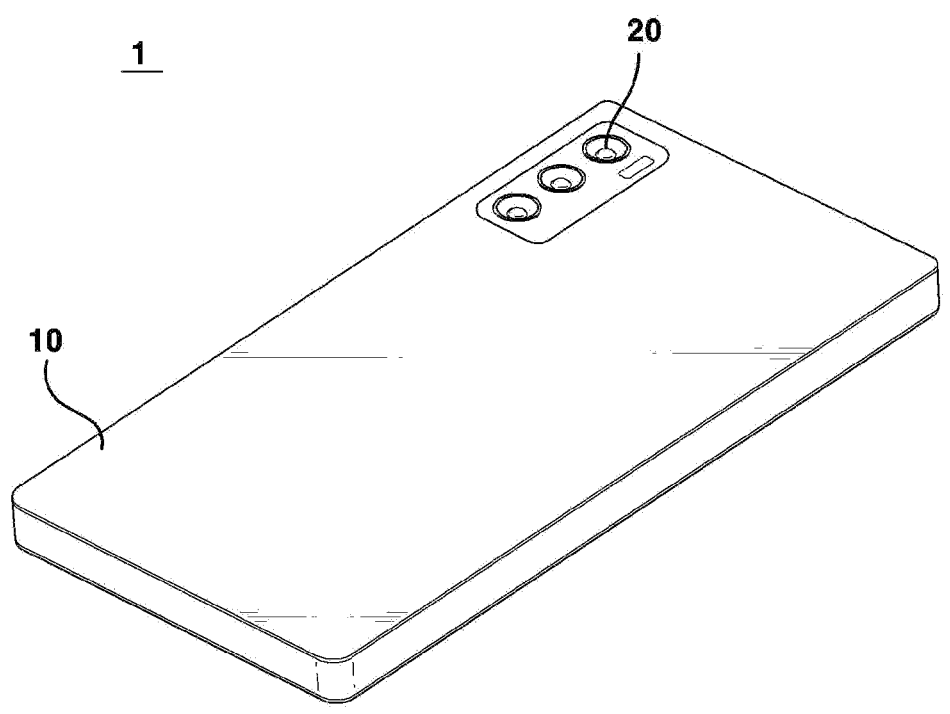

FIG. 50 is a perspective view of the rear of the optical device according to the present embodiment.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, a reflective member driving device according to the present embodiment will be described with reference to drawings.

Figure 6:
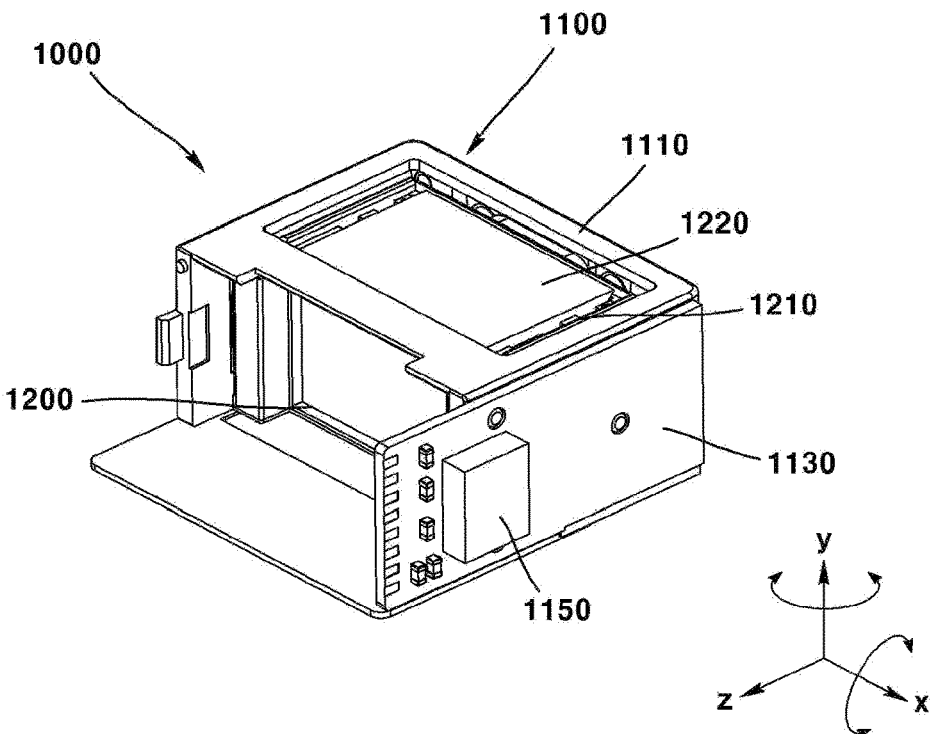
FIG. 6 is a perspective view of a reflective member driving device according to the present embodiment.
Figure 7:
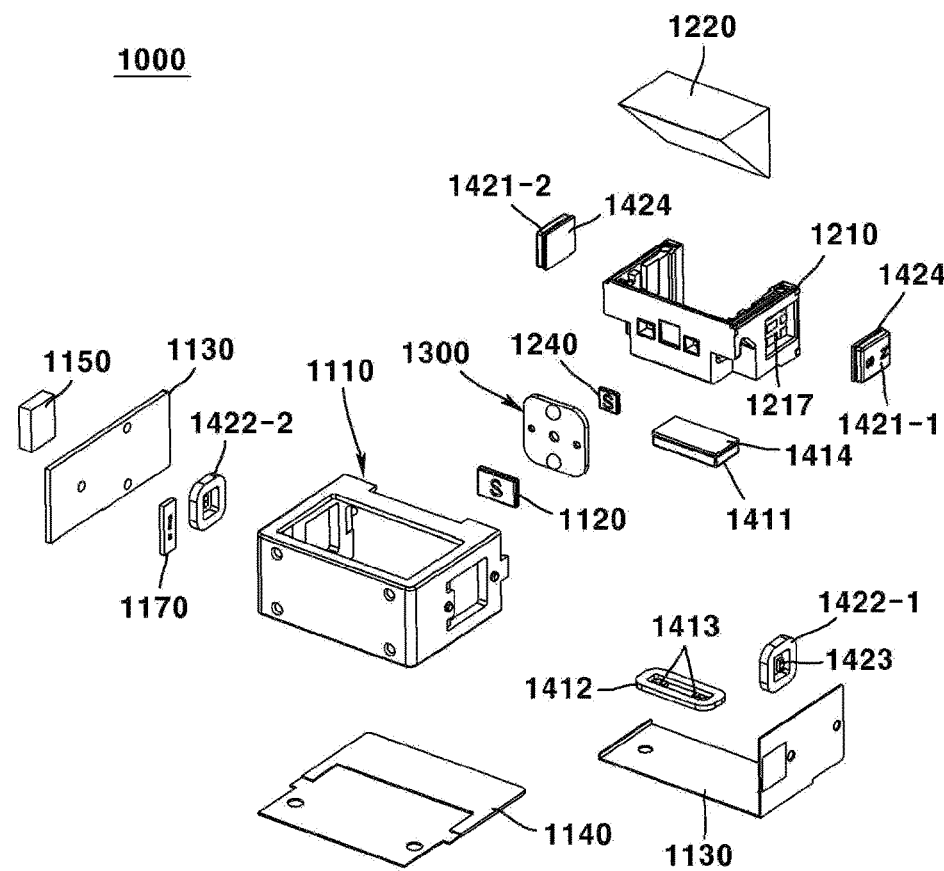
FIG. 7 is an exploded perspective view of the reflective member driving device according to the present embodiment.
Figure 8:
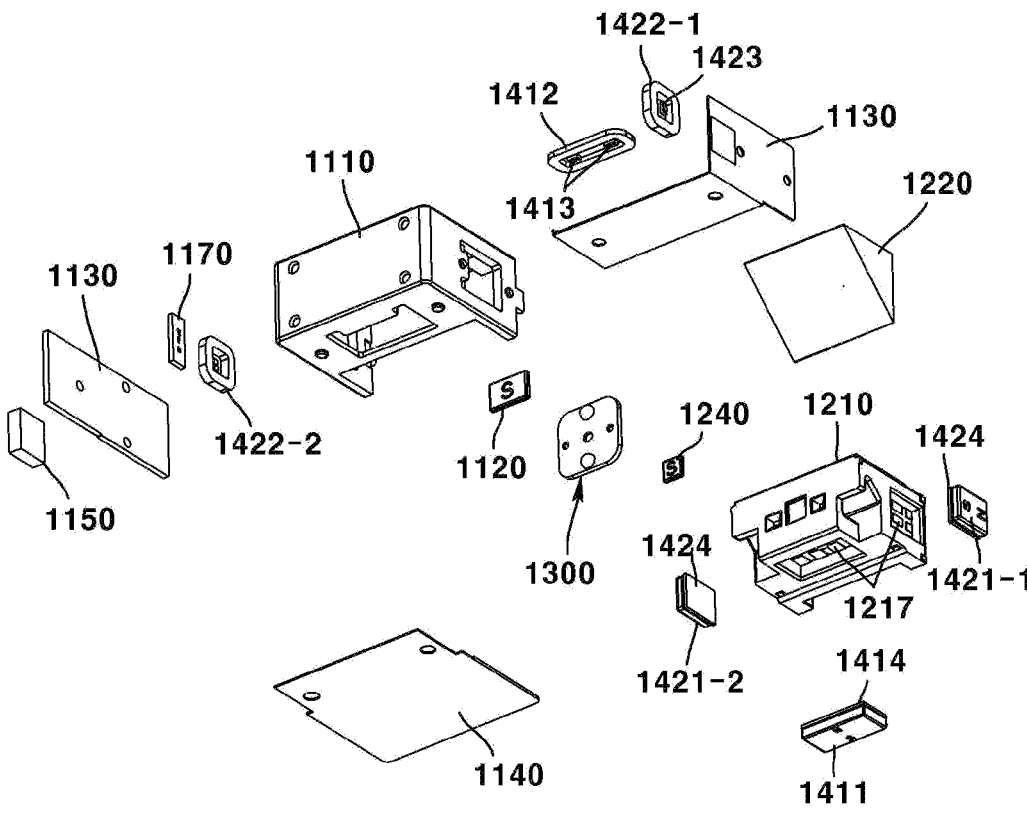
FIG. 8 is a bottom exploded perspective view of the reflective member driving device according to the present embodiment.
Figure 9:
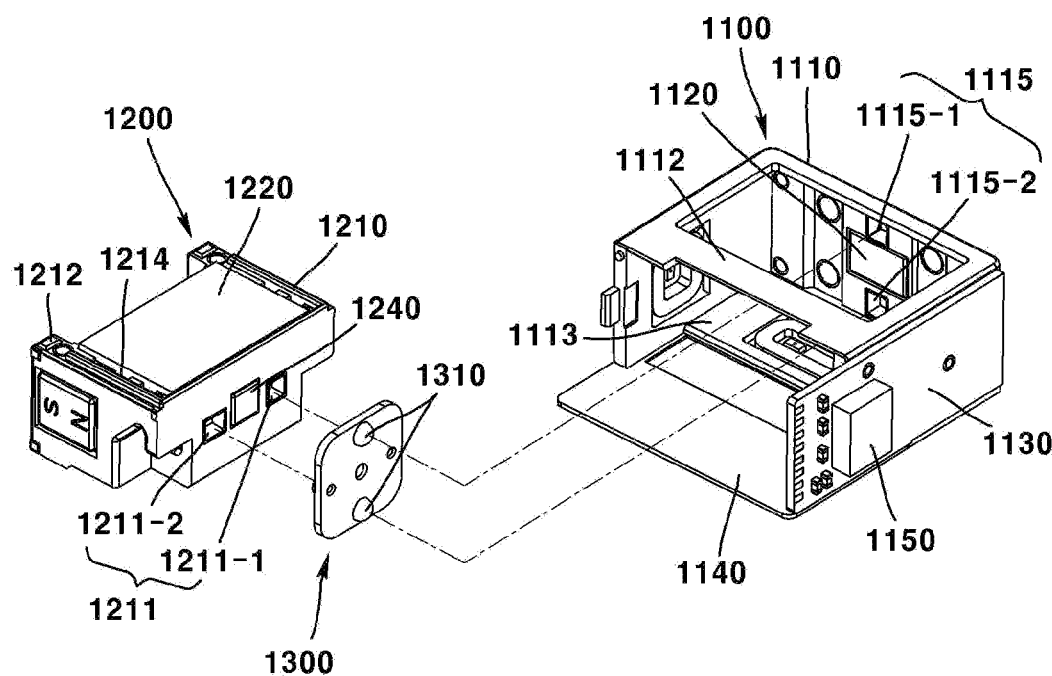
FIGS. 9 and 10 are views for explaining a structure related to a moving plate of a reflective member driving device according to the present embodiment.
Figure 10:
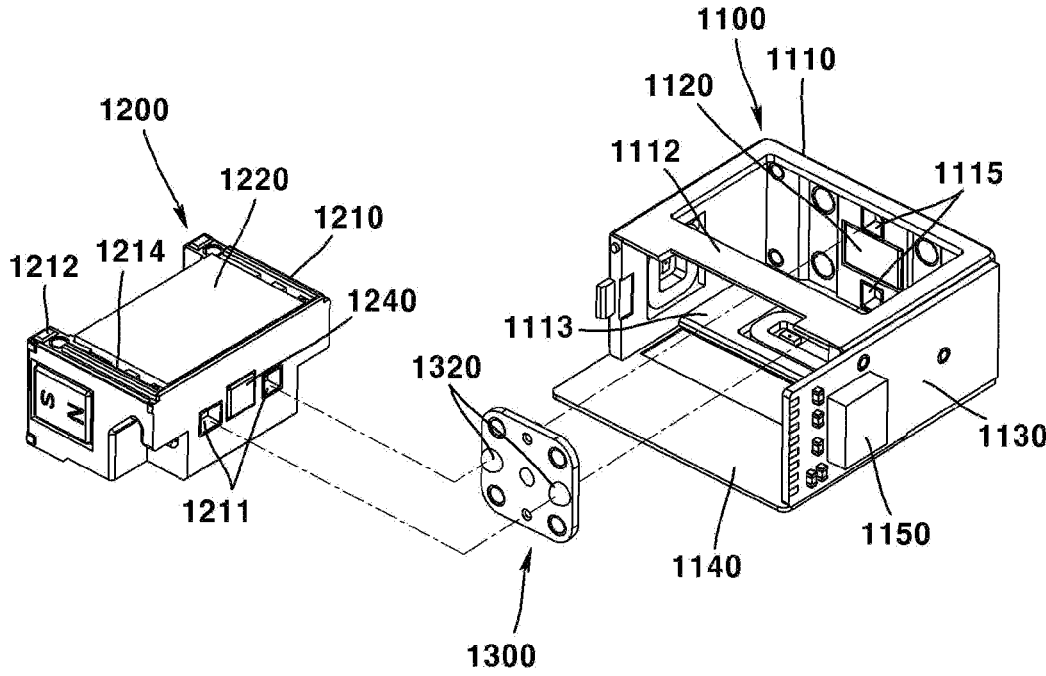
Figure 11:
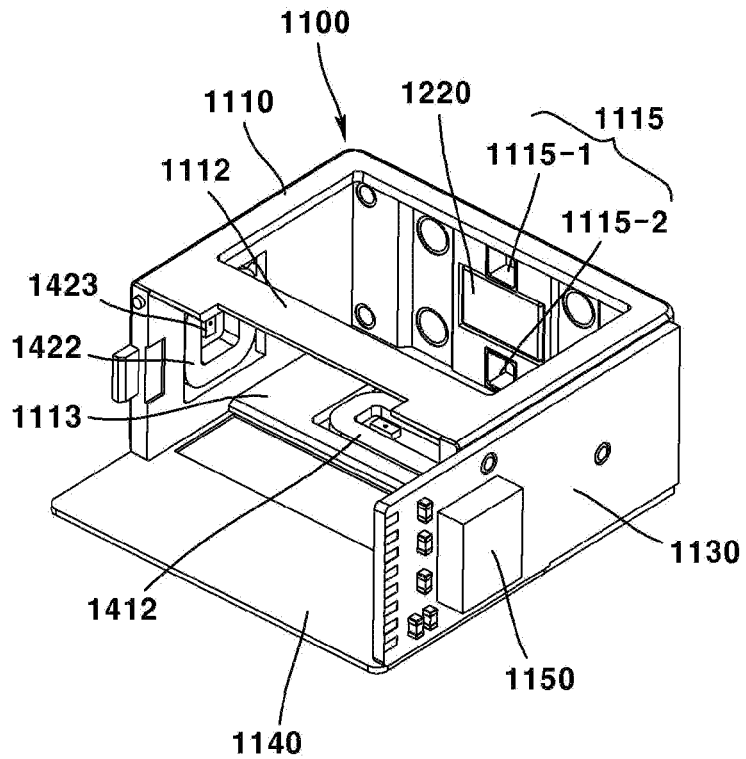
FIG. 11 is a perspective view of a state in which components such as a moving unit of a reflective member driving device according to the present embodiment are omitted.
Figure 12:
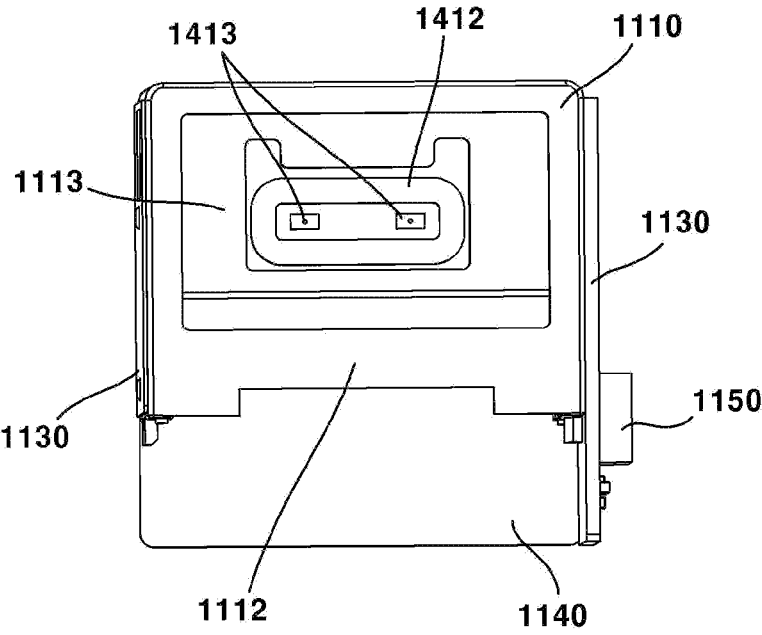
FIG. 12 is a plan view of a reflective member driving device in the state of FIG. 11.
Figure 13:
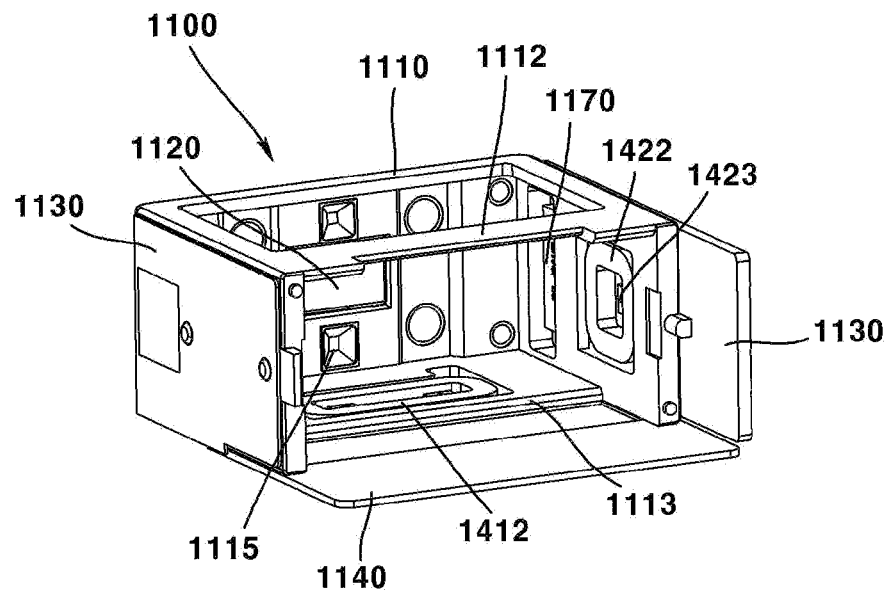
FIG. 13 is a perspective view of a reflective member driving device in the state of FIG. 11 viewed from a direction different from that of FIG. 11.
Figure 14:
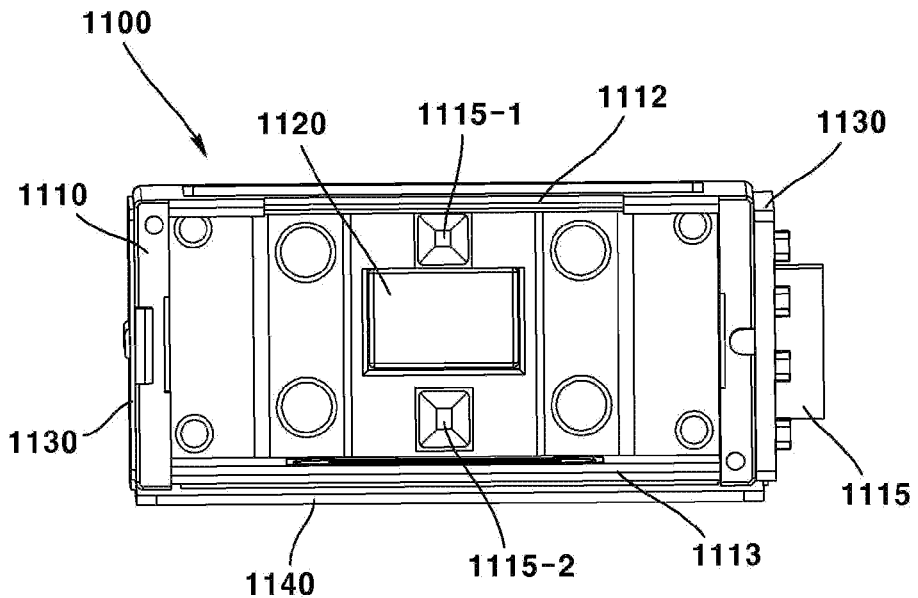
FIG. 14 is a rear view of a reflective member driving device in the state of FIG. 11 viewed from a direction different from that of FIG. 11.

FIG. 6 is a perspective view of a reflective member driving device according to the present embodiment; FIG. 7 is an exploded perspective view of the reflective member driving device according to the present embodiment; FIG. 8 is a bottom exploded perspective view of the reflective member driving device according to the present embodiment; FIGS. 9 and 10 are views for explaining a structure related to a moving plate of a reflective member driving device according to the present embodiment; FIG. 11 is a perspective view of a state in which components such as a moving unit of a reflective member driving device according to the present embodiment are omitted; FIG. 12 is a plan view of a reflective member driving device in the state of FIG. 11; FIG. 13 is a perspective view of a reflective member driving device in the state of FIG. 11 viewed from a direction different from that of FIG. 11; FIG. 14 is a rear view of a reflective member driving device in the state of FIG. 11 viewed from a direction different from that of FIG. 11; FIG. 15 is a perspective view illustrating a moving unit and related components of a reflective member driving device according to the present embodiment; FIG. 16 is a front view of a reflective member driving device in the state of FIG. 15; FIG. 17 is a perspective view of a reflective member driving device shown in FIG. 15 when viewed from a different direction than that of FIG. 15; FIG. 18 is a perspective view illustrating a magnet and a coil of a reflective member driving device according to the present embodiment; FIG. 19*a* is a cross-sectional view of a reflective member driving device according to the present embodiment; FIG. 19*b* is a perspective view of the reflective member driving device in the state of FIG. 19*a*; FIG. 19*c* is a cross-sectional view of a reflective member driving device according to a modified embodiment; and FIG. 20 is a cross-sectional view of a reflective member driving device according to a modified embodiment.

The reflective member driving device 1000 may perform optical image stabilization (OIS) function. The reflective member driving device 1000 may perform a handshake correction function. The reflective member driving device 1000 may move the reflective member 1220. The reflective member driving device 1000 may tilt the reflective member 1220. The reflective member driving device 1000 may tilt the reflective member 1220 about two axes. The reflective member driving device 1000 may tilt the reflective member 1220 about an x-axis and a y-axis. The x-axis and y-axis may be perpendicular to each other.

The reflective member driving device 1000 may be a reflective member actuator. The reflective member driving device 1000 may be an OIS actuator. The reflective member driving device 1000 may be an OIS driving device. The reflective member driving device 1000 may be a prism driving device. The reflective member driving device 1000 may be an actuator. The reflective member driving device 1000 may be an actuator device. The reflective member driving device 1000 may be an actuator driving device. The reflective member driving device 1000 may be a tilting device.

The reflective member driving device 1000 may comprise a stationary unit 1100. The stationary unit 1100 may be a relatively fixed part when the moving unit 1200 moves. The stationary unit 1100 may accommodate at least a portion of the moving unit 1200. The stationary unit 1100 may be disposed outside the moving unit 1200.

The reflective member driving device 1000 may comprise a housing 110. The stationary unit 110 may comprise a housing 1110. The housing 1110 may be disposed outside the holder 1210. The housing 1110 may accommodate at least a portion of the holder 1210. The housing 1110 may comprise an opening or hole for securing a path of light in an upper plate and one of the side plates. The housing 1110 may comprise an upper plate, a lower plate, and pluralities of side plates.

The housing 1110 may comprise a first portion 1112. The first portion 1112 may be disposed above the holder 1210. The first portion 1112 may come into contact with the holder 1210 when the holder 1210 moves upward. The first portion 1112 may be overlapped with the holder 1210 in a moving direction of the holder 1210. The first portion 1112 may be an upper plate of the housing 1110.

The housing 1110 may comprise a second portion 1113. The third portion 1113 may be disposed below the holder 1210. The second portion 1113 may come into contact with the holder 1210 when the holder 1210 moves downward. The second portion 1113 may be overlapped with the holder 1210 in a moving direction thereof. The second portion 1113 may be a lower plate of the housing 1110.

The housing 1110 may comprise a groove 1115. The groove 1115 may be a moving plate first protrusion accommodating groove. The first protrusion 1310 of the moving plate 1300 may be disposed in the groove 1115. The groove 1115 may accommodate at least a portion of the moving plate 1300. The groove 1115 may arrest the movement of the first protrusion 1310 of the moving plate 1300 except rotation. The groove 1115 may comprise an inclined surface being in contact with the first protrusion 1310 of the moving plate 1300. The inclined surface may comprise multiple inclined surfaces.

The housing 1110 may comprise pluralities of grooves 1115 in which pluralities of first protrusions 1310 are disposed. The plurality of grooves 1115 of the housing 1110 may comprise: a first groove 1115-1 in four-point contact with one first protrusion 1310 among pluralities of first protrusions 1310; and a second groove 1115-2 in contact with the other first protrusion 1310 at two points among the plurality of first protrusions 1310.

The groove 1115 may comprise a first groove 1115-1. The first groove 1115-1 may be a 4-point contact groove. The first groove 1115-1 may be in contact with one of the two first protrusions 1310 of the moving plate 1300 at four points. Through this, the first groove 1115-1 of the housing 1110 can arrest the movement in four directions except for the rotation of one protrusion among the first protrusion 1310 of the moving plate 1300.

The groove 1115 may comprise a second groove 1115-2. The second groove 1115-2 may be a two-point contact groove. The second groove 1115-2 may be in contact with the remaining one of the two first protrusions 1310 of the moving plate 1300 at two points. Through this, the second groove 1115-2 of the housing 1110 may arrest the movement of the remaining one protrusion of the first protrusion 1310 of the moving plate 1300 in two directions. For an example, the second groove 1115-2 of the housing 1110 may arrest the movement of the first protrusion 1310 of the moving plate 1300 in a left and right direction, but may not arrest the movement in an up-down direction.

The reflective member driving device 1000 may comprise a second attractive member. The stationary unit 1100 may comprise a second attractive member. The second attractive member may be disposed in the housing 1110. The second attractive member may act an attractive force with the first attractive member. The second attractive member may be disposed so that attractive force acts with the first attractive member.

The reflective member driving device 1000 may comprise a second magnet 1120. The stationary unit 1100 may comprise a second magnet 1120. The second magnet 1120 may be a second attraction magnet. The second magnet 1120 may be a second attractive member. The second magnet 1120 may be disposed in the stationary unit 1100. The second magnet 1120 may be disposed in the housing 1110. The second magnet 1120 may generate attractive force with the first magnet 1240. The second magnet 1120 may be disposed so as to generate attractive force with the first magnet 1240. The second magnet 1120 may be disposed to face the first magnet 1240. The second magnet 1120 may generate attractive force with the first magnet 1240. The second magnet 1120 may be disposed to generate an attractive force with the first magnet 1240. The second magnet 1120 may be disposed so that different polarities from the first magnet 1240 face each other. The second magnet 1120 may attract the first magnet 1240.

In the present embodiment, the drive unit 1400 may tilt the moving unit 1200 with respect to the mutually perpendicular x-axis and y-axis of the moving plate 1300. At this time, in a direction of the y-axis, the horizontal axis passing through the center of the second magnet 1120 may be disposed to be eccentric with the x-axis of the moving plate 1300. The horizontal axis may be parallel to the x-axis.

In the direction passing the x-axis, the center of the second magnet 1120 may not be eccentric with the y-axis. When viewed from the moving plate 1300 toward the first magnet 1240, the center of the second magnet 1120 may be disposed to coincide with the y-axis. The center of the second magnet 1120 may be disposed at the same height as the center of the first magnet 1240. The center of the second magnet 1120 may be disposed at the same height as the center of the first magnet 1240. The center of gravity of the second magnet 1120 may be disposed at the same height as the center of gravity of the first magnet 1240.

The reflective member driving device 1000 may comprise a substrate 1130. The stationary unit 1100 may comprise a substrate 1130. The substrate 1130 may be a flexible printed circuit board (FPCB). The substrate 1130 may be a flexible printed circuit board. The substrate 1130 may be disposed in the housing 1110.

The reflective member driving device 1000 may comprise a SUS 1140. The stationary unit 1100 may comprise a SUS 1140. The SUS 1140 may be disposed on the substrate 1130. The SUS 1140 may be disposed on an outer surface of the substrate 1130. The SUS 1140 can reinforce the strength of the substrate 1130. The SUS 1140 may be disposed on a lower surface of the housing 1110. The SUS 1140 may be coupled to a lower surface of the housing 1110. The SUS 1140 may be fixed to a lower surface of the housing 1110.

The reflective member driving device 1000 may comprise a gyro sensor 1150. The stationary unit 1100 may comprise a gyro sensor 1150. The gyro sensor 1150 can detect shaking of the camera device 10. The shaking detected by the gyro sensor 1150 can be canceled through the handshake correction function. The gyro sensor 1150 may be disposed in the substrate 1130. The gyro sensor 1150 may be disposed on an outer surface of the substrate 1130.

The reflective member driving device 1000 may comprise a driver IC 1170. The stationary unit 1100 may comprise a driver IC 1170. The driver IC 1170 may be disposed in substrate 1130. The driver IC 1170 may be electrically connected to the first coil 1412 and the second coil 1422. The driver IC 1170 may supply current to the first coil 1412. The driver IC 1170 may supply current to the second coil 1422. The driver IC 1170 can control one or more of the voltage and current applied to each of the first coil 1412 and the second coil 1422. The driver IC 1170 may be electrically connected to Hall sensors 1413 and 1423. The driver IC 1170 can feedback-controlled the voltage and current being applied to the first coil 1412 and the second coil 1422 through the position of the reflective member 1220 detected by the Hall sensors 1413 and 1423.

The reflective member driving device 1000 may comprise a moving unit 1200. The moving unit 1200 may be a moving part. The moving unit 1200 may be a movable part. The moving unit 1200 may be a mover. The moving unit 1200 can move against the stationary unit 1100. The moving unit 1200 may be tilted against the stationary unit 1100. The moving unit 1200 may be disposed inside the stationary unit 1100. At least a portion of the moving unit 1200 may be spaced apart from the stationary unit 1100.

In the present embodiment, in an initial state in which current is not applied to the driver unit 1400, the moving unit 1200 may come into contact with the stationary unit 1100. In an initial state in which no current is applied to the first drive unit 1410, the holder 1210 may be in contact with the housing 1110. In an initial state in which no current is applied to the first coil 1412, the holder 1210 may be in contact with the housing 1110. In an initial state, the holder 1210 may be in contact with the first portion 1112 of the housing 1110.

The reflective member driving device 1000 may comprise a holder 1210. The moving unit 1200 may comprise a holder 1210. The holder 1210 may be disposed inside the housing 1110. The holder 1210 is movable against the housing 1110. The holder 1210 may be tilted against the housing 1110. At least a portion of the holder 1210 may be spaced apart from the housing 1110. The holder 1210 may be in contact with the housing 1110.

In the present embodiment, the holder 1210 may move between the second portion 1112 and the third portion 1113 of the housing 1110 by the first drive unit 1410. In an initial state in which current is not applied to the first drive unit 1410, the holder 1210 may come into contact with the housing 1110. In an initial state, the holder 1210 may be in contact with an inner surface of the housing 1110 adjacent to the incident surface of the reflective member 1220. As a current is applied to the driver unit 1400, the holder 1210 is spaced apart from the inner surface of the housing 1110 and may be tilted with respect to the first axis of the moving plate 1300.

The holder 1210 may comprise a groove 1211. The groove 1211 may be a moving plate second protrusion accommodating groove. A second protrusion 1320 of the moving plate 1300 may be disposed in the groove 1211. The groove 1211 may accommodate at least a portion of the moving plate 1300. The groove 1211 may arrest the movement of the second protrusion 1320 of the moving plate 1300 except rotation. The groove 1211 may comprise an inclined surface being in contact with the second protrusion 1320 of the moving plate 1300. An inclined surface may comprise multiple inclined surfaces.

The holder 1210 may comprise pluralities of grooves 1211 in which pluralities of second protrusions 1320 are disposed. The plurality of grooves 1211 of the holder 1210 may comprise a first groove 1211-1 in four-point contact with one second protrusion 1320 among the plurality of second protrusions 1320, and a second groove 1211-2 being in contact with the other second protrusion 1320 at two points among the plurality of second protrusions 1320.

The groove 1211 may comprise a first groove 1211-1. The first groove 1211-1 may be a 4-point contact groove. The first groove 1211-1 may contact one of the two second protrusions 1320 of the moving plate 1300 at four points. Through this, the first groove 1211-1 of the holder 1210 can arrest the movement in up, down, left, right four directions except for the rotation of one protrusion among the second protrusion 1320 of the moving plate 1300.

The groove 1211 may comprise a second groove 1211-2. The second groove 1211-2 may be a two-point contact groove. The second groove 1211-2 may be a two-point contact groove. The second groove 1211-2 may be in contact with the remaining one of the two second protrusions 1320 of the moving plate 1300 at two points. Through this, the second groove 1211-2 of the holder 1210 may arrest the movement of the remaining protrusion of the second protrusion 1320 among the moving plate 1300 in two directions. For an example, the second groove 1211-2 of the holder 1210 may arrest the movement of the second protrusion 1320 among the moving plate 1300 in a left-right direction and may not arrest the movement in an up-down direction.

The holder 1210 may comprise a first protrusion 1212. The first protrusion 1212 may be an upper stopper. The first protrusion 1212 may be formed on an upper surface of the holder 1210. The first protrusion 1212 may be protruded from the upper surface of the holder 1210. The first protrusion 1212 may be in contact with the housing 1110 when the holder 1210 moves upward. The first protrusion 1212 may be in contact with the second portion 1112 of the housing 1110 when the holder 1210 moves upward.

The holder 1210 may comprise a second protrusion 1213. The second protrusion 1213 may be a lower stopper. The second protrusion 1213 may be formed on a lower surface of the holder 1210. The second protrusion 1213 may be protruded from a lower surface of the holder 1210. The second protrusion 1213 may be in contact with the housing 1110 when the holder 1210 moves downward. The second protrusion 1213 may be in contact with the third portion 1113 of the housing 1110 when the holder 1210 moves downward.

In the present embodiment, the first protrusion 1212 of the holder 1210 may come into contact with the second portion 1112 of the housing 1110 in an initial state. The second protrusion 1213 of the holder 1210 may come into contact with the third portion 1113 of the housing 1110 by applying current to the first drive unit 1410 or by an impact.

The holder 1210 may comprise an adhesive accommodating groove 1214. The adhesive accommodating groove 1214 may accommodate an adhesive for fixing the reflective member 1220 to the holder 1210. The adhesive accommodating groove 1214 may be formed on a surface being in contact with the reflective member 1220. An adhesive may be disposed in the adhesive accommodating groove 1214.

The holder 1210 may comprise a groove 1215. The groove 1215 may be a separation groove providing a separation space between the reflective member 1220 and the reflective member 1220. The groove 1215 may be formed on a surface being in contact with the reflective member 1220. The contact area between the reflective member 1220 and the holder 1210 may be reduced due to the groove 1215.

The holder 1210 may comprise a groove 1216. The groove 1216 may be a slimming groove. The groove 1216 may be formed in a central portion of the holder 1210. The weight of the holder 1210 may be reduced by the groove 1216.

The holder 1210 may comprise a magnet accommodating groove 1217. In the magnet accommodating groove 1217, driving magnets 1411 and 1421 may be disposed. The magnet accommodating groove 1217 may be formed in a shape corresponding to the driving magnets 1411 and 1421. The magnet accommodating groove 1217 may be concavely formed on a lower surface of the holder 1210. The magnet accommodating groove 1217 may be formed on a lower surface and both side surfaces of the holder 1210. The magnet accommodating groove 1217 may comprise pluralities of magnet accommodating grooves. The magnet accommodating groove 1217 may comprise a first magnet accommodating groove accommodating the first driving magnet 1411 and a yoke 1414. The magnet accommodating groove 1217 may comprise a second magnet accommodating groove accommodating the second driving magnet 1421 and a second yoke 1424.

The holder 1210 may comprise a lateral stopper 1219. The lateral stoppers 1219 may be formed on both sides of the holder 1210. The lateral stopper 1219 may be protruded from the side surface of the holder 1210. The lateral stopper 1219 may come into contact with the housing 1110 when the holder 1210 moves laterally. The lateral stopper 1219 may come into contact with the side plate of the housing 1110 when the holder 1210 moves laterally.

The reflective member driving device 1000 may comprise a reflective member 1220. The moving unit 1200 may comprise a reflective member 1220. The reflective member 1220 may be disposed in the holder 1210. The reflective member 1220 may be disposed inside the holder 1210. The reflective member 1220 may be coupled to the holder 1210. The reflective member 1220 may be fixed to the holder 1210. The reflective member 1220 may be fixed to the holder 1210 using an adhesive. The reflective member 1220 may move integrally with the holder 1210. The reflective member 1220 may change a path of light. The reflective member 1220 may reflect light. The reflective member 1220 may comprise a prism. The reflective member 1220 may comprise a mirror. The reflective member 1220 may be formed in a triangular prism shape. The angle between a path of light incident on the reflective member 1220 and a path of light emitted may be 90 degrees. Light may be incident on an upper surface of the reflective member 1220. Light may be emitted from the rear surface of the reflective member 1220. The center of the reflective member 1220 may be disposed higher than the center of the holder 1210.

The reflective member driving device 1000 may comprise a first attractive member. The moving unit 1200 may comprise a first attractive member. An attractive force may act between the first attractive member and the second attractive member.

The reflective member driving device 1000 may comprise a first magnet 1240. The moving unit 1200 may comprise a first magnet 1240. The first magnet 1240 may be a first attractive member. The first magnet 1240 may be a first attraction magnet. The first magnet 1240 may be disposed in the moving unit 1200. The first magnet 1240 may be disposed in the holder 1210. The first magnet 1240 may be disposed to face the second magnet 1120. The first magnet 1240 may be disposed to generate an attractive force with the second magnet 1120. The first magnet 1240 may be disposed so that different polarities from the second magnet 1120 face each other. The first magnet 1240 may attract the second magnet 1120. One of the first magnet 1240 and the second magnet 1120 may be referred to as a first attractive member, and the other may be referred to as a second attractive member.

An imaginary first straight line connecting the center of the first attractive member and the center of the second attractive member (see a in FIGS. 16 and 19) passes through the first axis and may be spaced apart from the imaginary second straight line (see b in FIGS. 16 and 19) parallel to the first straight line (see c in FIGS. 16 and 19). The first straight line may be placed higher than the second straight line. The first straight line may be spaced apart from the second straight line in a first direction. The first straight line may be overlapped with the second straight line in a first direction. At this time, the first direction may be parallel to a second axis. The center of the first attractive member may be disposed at the same height as the center of the second attractive member.

The first attractive member may comprise a magnet. The first attractive member may comprise a first magnet 1240. The second attractive member may comprise a magnet. The second attractive member may comprise a second magnet 1120. In a modified embodiment, one of the first attractive member and the second attractive member may comprise a magnet and the other may comprise a metal yoke. At this time, the magnet may be a pulling magnet and the yoke may be a pulling yoke. The first attractive member may comprise a first magnet 1240, and the second attractive member may comprise a yoke instead of the second magnet 1120. The first attractive member may comprise a yoke instead of the first magnet 1240, and the second attractive member may comprise the second magnet 1120.

In the present embodiment, the central axis of the first magnet 1240 may be disposed to be eccentric with the central axis of the moving plate 1300 with respect to a first optical axis. At this time, the first optical axis may be a z-axis. The first optical axis may be an axis perpendicular to the sensor surface of the image sensor 3400. The first optical axis may be an optical axis of lens groups being disposed adjacent to the image sensor 3400.

The horizontal central axes of the first magnet 1240 and the second magnet 1120 may be eccentrically disposed to have a gap in the vertical direction with the horizontal central axis of the moving plate 1300.

When viewed from a direction directing from the moving plate 1300 toward the first magnet 1240, the center of the first magnet 1240 may be disposed to be eccentric with the center of the moving plate 1300.

With respect to the facing surface, the horizontal axis passing through the central axis of the first magnet 1240 may be eccentric in the direction of the horizontal axis passing through the central axis of the moving plate 1300 and a second optical axis perpendicular to the first optical axis. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. Based on the facing surface, the horizontal axis that meets or contacts the central axis of the first magnet 1240 may be eccentric in the direction of the horizontal axis passing through the central axis of the moving plate 1300 and a second optical axis perpendicular to the first optical axis. The center of the first magnet 1240 may be disposed to be eccentric in a vertical direction with respect to the center of the moving plate 1300.

With respect to the facing surfaces, a vertical axis passing through the central axis of the first magnet 1240 may not be eccentric in directions of a vertical axis and a horizontal axis passing through the central axis of the moving plate 1300. At this time, the horizontal axis may be an x-axis. The horizontal axis may be disposed in a horizontal direction. The second optical axis may be a y-axis. The second optical axis may be an axis parallel to the sensor surface of the image sensor 3400. The second optical axis may be disposed in a vertical direction. The center of the first magnet 1240 may be disposed so as not to be eccentric in the horizontal direction with respect to the center of the moving plate 1300.

With respect to the facing surface, a horizontal line passing through the center of the first magnet 1240 may be eccentric with a horizontal line passing through the center of the moving plate 1300 in a vertical direction. With respect to the facing surface, a vertical line passing through the center of the first magnet 1240 may not be eccentric with a vertical line passing through the center of the moving plate 1300 in a horizontal direction.

The horizontal axis of the first magnet 1240 may be disposed higher than a horizontal axis of the moving plate 1300. As a modified embodiment, the horizontal axis of the first magnet 1240 may be disposed lower than the horizontal axis of the moving plate 1300.

The size of the first magnet 1240 may be different from the size of the second magnet 1120. The first magnet 1240 may be formed in a different size from the second magnet 1120. The size of the first magnet 1240 may be smaller than the size of the second magnet 1120. The first magnet 1240 may be formed to be smaller than the second magnet 1120. In a modified embodiment, the size of the first magnet 1240 may be larger than the size of the second magnet 1120. The first magnet 1240 may be formed to be larger than the second magnet 1120.

The area of the first surface of the first magnet 1240 may be greater than the area of the second surface of the second magnet 1120 facing the first surface. The first and second surfaces are arbitrarily referred to, and either of them may be referred to as a first surface, the other may be referred to as a second surface, and both may be referred to as a first surface. The first magnet 1240 may comprise a first surface. The second magnet 1120 may comprise a first surface facing the first surface of the first magnet 1240. The area of the first surface of the first magnet 1240 may be smaller than that of the first surface of the second magnet 1120.

Central axes of the first magnet 1240 and the second magnet 1120 may coincide. However, a tolerance of ±1% to ±2% may occur in actual products.

In the present embodiment, the second magnet 1120 may comprise a second surface facing the first surface of the first magnet 1240. At this time, in a direction perpendicular to the first surface, the central axis of the first magnet 1240 may be disposed to be eccentric with the central axis of the moving plate 1300. The area of the first surface of the first magnet 1240 may be greater than the area of the second surface of the second magnet 1120.

In the present embodiment, the force Fx being formed by the first drive unit 1410 may be around 7 mN. In addition, the force Fy being formed by the second drive unit 1420 may be within 7 mN. Or, the force Fx being formed by the first drive unit 1410 may be within 3 mN. In addition, the force Fy being formed by the second drive unit 1420 may be within 3 mN.

The first surface of the first magnet 1240 may be formed in a square shape. A first surface of the second magnet 1120 may be formed in a square shape. Or, each of the first surface of the first magnet 1240 and the first surface of the second magnet 1120 may be formed in a rectangular shape. At least a portion of the first magnet 1240 may have a square cross section. At least a portion of the second magnet 1120 may have a square cross section. The first magnet 1240 may have a rounded edge. The second magnet 1120 may have a rounded edge.

As a modified embodiment, the first magnet 1240 may have a circular cross section. The first magnet 1240 may be formed in a cylindrical shape. The second magnet 1120 may have a circular cross section. The second magnet 1120 may be formed in a cylindrical shape. The first magnet 1240 may formed to have a rounded edge. The first magnet 1240 may be formed to have a curved edge. The edge of the first magnet 1240 may be formed to have a curvature. The first magnet 1240 may be formed to have a C-cut or R-cut edge. The second magnet 1120 may be formed to have a rounded edge. The second magnet 1120 may be formed to have a curved edge. The edge of the second magnet 1120 may be formed to have a curvature. The second magnet 1120 may be formed to have a C-cut or R-cut edge.

The reflective member driving device 1000 may comprise a moving plate 1300. The moving plate 1300 may be an intermediate plate. The moving plate 1300 may be disposed between the housing 1110 and the holder 1210. The moving plate 1300 may be disposed between the rigid mover 1230 and the holder 1210. The moving plate 1300 may be disposed between the first magnet 1240 and the holder 1210. The moving plate 1300 may be disposed between the stationary unit 1100 and the moving unit 1200. The moving plate 1300 may be disposed between the first surface of the second magnet 1120 and the holder 1210. The moving plate 1300 may guide the movement of the holder 1210 against the housing 1110. The moving plate 1300 may provide a tilt center of the holder 1210. That is, the holder 1210 may be tilted about the moving plate 1300. One side of the moving plate 1300 may be disposed in the holder 1210 and the other side may be disposed in the housing 1110. The moving plate 1300 may be in contact with the holder 1210 and the housing 1110.

The moving plate 1300 may comprise a first surface facing the housing 1110 and a second surface facing the holder 1210. The first surface of the moving plate 1300 may comprise pluralities of first protrusions 1310 being spaced apart from each other in a first axis direction. The second surface of the moving plate 1300 may comprise pluralities of second protrusions 1320 being spaced apart from each other in a second axis direction.

The moving plate 1300 may comprise pluralities of first convex portions formed on one surface and pluralities of second convex portions formed on the other surface. The first convex portion may be a first protrusion 1310. The second convex portion may be a second protrusion 1320. The x-axis may correspond to a straight line connecting two convex portions among the plurality of first convex portions. The x-axis may coincide with or be parallel to a straight line connecting two convex portions among the plurality of first convex portions. The y-axis may correspond to a straight line connecting two convex portions among the plurality of second convex portions. The y-axis may coincide with or be parallel to a straight line connecting two of the plurality of second convex portions. As a modified embodiment, the first convex portion may be second protrusion 1320 and the second convex portion may be first protrusion 1310.

The moving plate 1300 may comprise a first protrusion 1310. The first protrusion 1310 may be disposed in the housing 1110. The first protrusion 1310 may come into contact with the housing 1110. The first protrusion 1310 may be disposed in the groove 1115 of the housing 1110. The first protrusion 1310 may provide a second axis tilt center perpendicular to the first axis for the holder 1210. The first protrusion 1310 may provide a y-axis tilt center for the holder 1210. The first protrusion 1310 may comprise two first protrusions. The two first protrusions may be spaced apart in a y-axis direction. The two first protrusions may be disposed on a y-axis. The holder 1210 may be tilted about the first protrusion 1310 of the moving plate 1300 by the second drive unit 1420. The holder 1210 may be tilted in left and right direction about the first protrusion 1310 of the moving plate 1300 by the second drive unit 1420.

As illustrated in FIG. 19c, the first protrusion 1310 can be replaced with a ball 1310a. The reflective member driving device 1000 may comprise a ball 1310a. The ball 1310a may be disposed between the moving plate 1300 and the housing 1110. The moving plate 1300 may comprise a hole or groove that accommodates a portion of the ball 1310a. In addition, a ball replacing the second protrusion 1320 may also be provided. The ball may be disposed between the moving plate 1300 and the holder 1210.

The moving plate 1300 may comprise a second protrusion 1320. The second protrusion 1320 may be disposed in the holder 1210. The second protrusion 1320 may be in contact with the holder 1210. The second protrusion 1320 may be disposed in the groove 1211 of the holder 1210. The second protrusion 1320 may provide a first axis tilt center for the holder 1210. The second protrusion 1320 may provide an x-axis tilt center for the holder 1210. The second protrusion 1320 may comprise two second protrusions. The two second protrusions may be spaced apart in an x-axis direction. The two second protrusions may be disposed on an x-axis. The holder 1210 may be tilted about the second protrusion 1320 of the moving plate 1300 by the first drive unit 1410. The holder 1210 may be tilted an up-down direction about the second protrusion 1320 of the moving plate 1300 by the first drive unit 1410.

A first axis of the moving plate 1300 may be defined by the second protrusion 1320 of the moving plate 1300 and the groove 1211 of the holder 1210. The first axis may be formed by the second protrusion 1320 of the moving plate 1300. A second axis of the moving plate 1300 may be defined by the first protrusion 1310 of the moving plate 1300 and the groove 1115 of the housing 1110. The second axis may be formed by the first protrusion 1310 of the moving plate 1300.

In a modified embodiment, the first protrusion 1310 of the moving plate 1300 may provide an x-axis tilt center for the holder 1210, and the second protrusion 1320 of the moving plate 1300 may provide a y-axis tilt center.

In a modified embodiment, as illustrated in FIG. 20, the moving plate 1300 may comprise a hole. The housing 1110 may comprise a protruding portion 1110a. The protruding portion 1110a may be protruded toward the holder 1210. At least a portion of the protruding portion 1110a may be disposed in a hole of the moving plate 1300. The second attractive member may be disposed in the protruding portion 1110a of the housing 1110. The second magnet 1120 may be disposed in the protruding portion 1110a of the housing 1110. The second magnet 1120 may be disposed in a hole of the moving plate 1300. Through this, the second magnet 1120 can directly face the first magnet 1240.

The reflective member driving device 1000 may comprise grease. The grease may be disposed between the moving plate 1300 and the housing 1110.

The reflective member driving device 1000 may comprise a drive unit 1400. The drive unit 1400 can move the moving unit 1200 against the stationary unit 1100. The drive unit 1400 may tilt the moving unit 1200 against the stationary unit 1100. The drive unit 1400 can tilt the holder 1210. The drive unit 1400 may tilt the moving unit 1200 with respect to the mutually perpendicular x-axis and y-axis of the moving plate 1300. The drive unit 1400 may comprise a coil and a magnet. The drive unit 1400 can move the moving unit 1200 through electromagnetic interaction. In a modified embodiment, the drive unit 1400 may comprise a shape memory alloy (SMA).

The drive unit 1400 may comprise a first drive unit 1410 and a second drive unit 1420. The first drive unit 1410 may comprise a first driving magnet 1411 and a first coil 1412. It may comprise a second drive unit 1420, a second driving magnet 1421, and a second coil 1422. The first driving magnet 1411 and the first coil 1412 can tilt the holder 1210 about a first axis. The second driving magnet 1421 and the second coil 1422 can tilt the holder 1210 about a second axis perpendicular to the first axis. One of the first driving magnet 1411 and the second driving magnet 1421 is referred to as a third magnet, and the other may be referred to as a fourth magnet.

The drive unit 1400 may comprise a first drive unit 1410. The first drive unit 1410 may tilt the moving unit 1200 about a first axis against the stationary unit 1100. The first drive unit 1410 may tilt the holder 1210 with respect to a first axis of the moving plate 1300. The first drive unit 1410 may tilt the holder 1210 about a first axis. The first drive unit 1410 may tilt the moving unit 1200 about an x-axis against the stationary unit 1100. The first drive unit 1410 may comprise a coil and a magnet. The first drive unit 1410 can move the moving unit 1200 through electromagnetic interaction. In a modified embodiment, the first drive unit 1410 may comprise a shape memory alloy (SMA).

The first drive unit 1410 may comprise a first driving magnet 1411. The first driving magnet 1411 may be disposed in the holder 1210. The first driving magnet 1411 may be disposed on a lower surface of the holder 1210. The first driving magnet 1411 may be fixed to the holder 1210. The first driving magnet 1411 may be fixed to the holder 1210 by an adhesive. The first driving magnet 1411 may be disposed between the holder 1210 and a lower surface of the housing 1110. The first driving magnet 1411 may be disposed between the holder 1210 and a lower plate of the housing 1110. The first driving magnet 1411 may move integrally with the holder 1210. The first driving magnet 1411 may tilt the holder 1210. The first driving magnet 1411 may tilt the holder 1210 about a first axis. The first driving magnet 1411 may be disposed to face the first coil 1412. The first driving magnet 1411 may face the first coil 1412. The first driving magnet 1411 may be disposed at a position corresponding to the first coil 1412. The first driving magnet 1411 may interact with the first coil 1412. The first driving magnet 1411 may interact with the first coil 1412 electromagnetically. At least a portion of the first driving magnet 1411 may be disposed in the groove 1217 of the holder 1210.

The first driving magnet 1411 may comprise a first surface in a direction directing toward the reflective member 1220. The second magnet 1120 may comprise a first surface in a direction directing toward the reflective member 1220. The first surface of the first driving magnet 1411 may comprise a first region most adjacent to the second magnet 1120. The first region of the first driving magnet 1411 may have a polarity different from that of the first surface of the second magnet 1120. The first surface of the first driving magnet 1411 may comprise a second region having a polarity different from that of the first region. The first region of the first driving magnet 1411 may have an S pole and the second region may have an N pole. At this time, the first surface of the second magnet 1120 may have an N pole. As a modified embodiment, the first region of the first driving magnet 1411 may have an N pole and the second region may have an S pole.

In the present embodiment, magnetic field interference can be minimized through arrangement of magnet polarities of the first driving magnet 1411 and the second magnet 1120.

The first driving magnet 1411 may comprise a second surface at an opposite side of the first surface of the first driving magnet 1411. The second surface of the first driving magnet 1411 may comprise a third region having a polarity different from that of the first region. The second surface of the first driving magnet 1411 may comprise a fourth region having a polarity different from that of the second region. The second surface of the first driving magnet 1411 may face the first coil 1412. The third region may have an N pole and the fourth region may have an S pole. As a modified embodiment, the third region may have an S pole and the fourth region may have an N pole.

The first driving magnet 1411 may comprise a neutral portion being disposed between a first region and a second region. The first driving magnet 1411 may comprise a neutral portion being disposed between the third region and the fourth region. The neutral portion may be a portion whose polarity is close to neutral. The neutral portion may be a void. Or, as a modified embodiment, the neutral portion may be disposed between the first region and the third region and between the second region and the fourth region.

The region of the first driving magnet 1411 most adjacent to the first surface of the second magnet 1120 may have a polarity generating an attractive force with the first surface of the second magnet 1120. The first surface of the second magnet 1120 and the first region of the first driving magnet 1411 most adjacent to the first surface of the second magnet 1120 may generate an attractive force to each other.

Each of the second magnet 1120 and the first driving magnet 1411 may comprise a first surface facing the central portion of the moving unit 1200. The first surface of the first driving magnet 1411 may comprise a first region and a second region having different polarities. The first surface of the second magnet 1120 may be disposed closer to the first driving magnet 1411 than the second driving magnet 1421. The first region of the first driving magnet 1411 may be disposed closer to the second magnet 1120 than the second region. The first region of the first driving magnet 1411 may have a polarity different from that of the first surface of the second magnet 1120.

Each of the second magnet 1120 and the first driving magnet 1411 may comprise a first surface facing the central portion of the holder 1210. The first surface of the first driving magnet 1411 and the first surface of the second magnet 1120 may comprise regions having different polarities.

The first drive unit 1410 may comprise a first coil 1412. The first coil 1412 may be disposed in the substrate 1130. The first coil 1412 may be disposed in the housing 1110. The first coil 1412 may be disposed at a position corresponding to the first driving magnet 1411 in the substrate 1130. The first coil 1412 may be disposed below the holder 1210. The first coil 1412 may interact with the first driving magnet 1411. When a current is applied to the first coil 1412, an electromagnetic field is formed around the first coil 1412 and can interact with the first driving magnet 1411. The first driving magnet 1411 and the first coil 1412 may tilt the holder 1210 with respect to the first axis. At this time, the first axis may be an x-axis.

In the present embodiment, a first direction driving current may be applied to the first coil 1412 to tilt the holder 1210. At this time, the second direction drive current, which is opposite to the first direction drive current, may not be used to tilt the holder 1210. That is, only current in either direction, reverse or forward, can be supplied to the first coil 1412.

The reflective member driving device 1000 may comprise a Hall sensor 1413. The Hall sensor 1413 may detect the first driving magnet 1411. The Hall sensor 1413 may detect the magnetic force of the first driving magnet 1411. The Hall sensor 1413 may detect the position of the holder 1210. The Hall sensor 1413 may detect the position of the reflective member 1220. The Hall sensor 1413 may detect the amount of tilt of the holder 1210 about an x-axis.

The reflective member driving device 1000 may comprise a yoke 1414. The yoke 1414 may be disposed between the first driving magnet 1411 and the holder 1210. The yoke 1414 may be formed in a shape corresponding to that of the first driving magnet 1411. The yoke 1414 may increase the interaction force between the first driving magnet 1411 and the first coil 1412.

The drive unit 1400 may comprise a second drive unit 1420. The second drive unit 1420 may tilt the moving unit 1200 about the second axis against the stationary unit 1100. The second drive unit 1420 may tilt the holder 1210 with respect to a second axis perpendicular to the first axis of the moving plate 1300. The second drive unit 1420 may tilt the moving unit 1200 about a y-axis against the stationary unit 1100. The second drive unit 1420 may comprise a coil and a magnet. The second drive unit 1420 may move the moving unit 1200 through electromagnetic interaction. As a modified embodiment, the second drive unit 1420 may comprise a shape memory alloy (SMA).

The second drive unit 1420 may comprise a second driving magnet 1421. The second driving magnet 1421 may be disposed in the holder 1210. The second driving magnet 1421 may be disposed on both side surfaces of the holder 1210. The second driving magnet 1421 may be fixed to the holder 1210. The second driving magnet 1421 may be fixed to the holder 1210 by an adhesive. The second driving magnet 1421 may be disposed between the side surface of the holder 1210 and the housing 1110. The second driving magnet 1421 may be disposed between the holder 1210 and the side plate of the housing 1110. The second driving magnet 1421 may move integrally with the holder 1210. The second driving magnet 1421 may tilt the holder 1210. The second driving magnet 1421 may tilt the holder 1210 about a second axis perpendicular to the first axis. The second driving magnet 1421 may be disposed to face the second coil 1422. The second driving magnet 1421 may face the second coil 1422. The second driving magnet 1421 may be disposed at a position corresponding to the second coil 1422. The second driving magnet 1421 may interact with the second coil 1422. The second driving magnet 1421 may interact with the second coil 1422 electromagnetically.

The second driving magnet 1421 may comprise a neutral portion having no polarity. The neutral portion may be a void. The neutral portion may be placed between the N pole and the S pole. The neutral portion may be disposed between a first portion corresponding to the front side of the second driving magnet 1421 and a second portion corresponding to the rear side. Or, the neutral portion may be disposed between the inner side portion and the outer side portion of the second driving magnet 1421.

The second driving magnet 1421 may comprise the first sub magnet 1421-1. The first sub magnet 1421-1 may be disposed on one side of the holder 1210. The first sub magnet 1421-1 may be disposed to face the first sub coil 1422-1. The first sub magnet 1421-1 may face the first sub coil 1422-1. The first sub magnet 1421-1 may be disposed at a position corresponding to the first sub coil 1422-1. The first sub magnet 1421-1 may interact with the first sub coil 1422-1. The first sub magnet 1421-1 may electromagnetically interact with the first sub coil 1422-1.

The second driving magnet 1421 may comprise a second sub magnet 1421-2. The second sub magnet 1421-2 may be disposed on the other side of the holder 1210. The second sub magnet 1421-2 may be disposed at an opposite side of the first sub magnet 1421-1. The second sub magnet 1421-2 may have the same size and shape as the first sub magnet 1421-1. The second sub magnet 1421-2 may be disposed to face the second sub coil 1422-2. The second sub magnet 1421-2 may face the second sub coil 1422-2. The second sub magnet 1421-2 may be disposed at a position corresponding to the second sub coil 1422-2. The second sub magnet 1421-2 may interact with the second sub coil 1422-2. The second sub magnet 1421-2 may electromagnetically interact with the second sub coil 1422-2.

The second drive unit 1420 may comprise a second coil 1422. The second coil 1422 may be disposed in the substrate 1130. The second coil 1422 may be disposed in the housing 1110. The second coil 1422 may be disposed in the second portion of the substrate 1130. The second coil 1422 may be disposed at both sides of the holder 1210. The second coil 1422 may be disposed to interact with the second driving magnet 1421. When current is applied to the second coil 1422, an electromagnetic field is formed around the second coil 1422 and can interact with the second driving magnet 1421. The second coil 1422 may comprise two sub coils 1421-1 and 1421-2 disposed opposite to each other with respect to the holder 1210. The two sub coils 1421-1 and 1421-2 may be electrically connected to each other. The second driving magnet 1421 and the second coil 1422 may tilt the holder 1210 with respect to a second axis perpendicular to the first axis. At this time, the second axis may be a y axis. The first axis may be an x-axis and a z-axis may be an optical axis of the image sensor 3400.

The second coil 1422 may comprise the first sub coil 1422-1. The first sub coil 1422-1 may be disposed in the substrate 1130. The first sub coil 1422-1 may be disposed in the housing 1110. The first sub coil 1422-1 may be disposed in a second portion of the substrate 1130. The first sub coil 1422-1 may be disposed at a side of the holder 1210. When a current is applied to the first sub coil 1422-1, an electromagnetic field is formed around the first sub coil 1422-1 and can interact with the first sub magnet 1421-1.

The second coil 1422 may comprise a second sub coil 1422-2. The second sub coil 1422-2 may be disposed in the substrate 1130. The second sub coil 1422-2 may be disposed in the housing 1110. The second sub coil 1422-2 may be disposed in a second portion of the substrate 1130. The second sub coil 1422-2 may be disposed at a side of the holder 1210. When a current is applied to the second sub coil 1422-2, an electromagnetic field is formed around the second sub coil 1422-2 and can interact with the second sub magnet 1421-2.

The second driving magnet 1421 may comprise a first sub magnet 1421-1 being disposed in the first side of the holder 1210 and a second sub magnet 1421-2 being disposed on a second side surface of the holder 1210. The second coil 1422 comprises a first sub coil 1422-1 being disposed in the substrate and disposed at a position corresponding to the first sub magnet 1421-1, and a second sub coil 1422-2 being disposed in the substrate and disposed at a position corresponding to the second sub magnet 1421-2.

The reflective member driving device 1000 may comprise a Hall sensor 1423. The Hall sensor 1423 may detect the second driving magnet 1421. The Hall sensor 1423 may sense the magnetic force of the second driving magnet 1421.

The Hall sensor 1423 may detect the position of the holder 1210. The Hall sensor 1423 may detect the position of the reflective member 1220. The Hall sensor 1423 may detect the amount of tilt of the holder 1210 about a y-axis.

The reflective member driving device 1000 may comprise a yoke 1424. The yoke 1424 may be disposed between the second driving magnet 1421 and the holder 1210. The yoke 1424 may be formed in a shape corresponding to that of the second driving magnet 1421. The yoke 1424 may increase the interaction force between the second driving magnet 1421 and the second coil 1422.

If the x-axis driving force is greater than the attractive force, the moving plate 1300 may be separated away. This may cause poor Hall calibration and dynamic characteristics. In addition, if the moving unit 1200 is mounted on the phone in a way that it is randomly positioned from the initial position, and if the camera is not driven, noise may be generated as the moving unit 1200 hits the stationary unit 1100 due to the shaking of the phone.

In the present embodiment, the central axis of the attractive force (center axis) and the central axis of the x-axis driving force may be offset by a certain distance. In the present embodiment, the reflective member 1220 may be mechanically shifted in an upward direction. Through this, it is possible to fundamentally inhibit concerns about the moving plate 1300 falling off due to the upper driving force by using only the downward driving force as the x-axis driving force. At this time, the upper driving force may be a force in the direction of pressing the moving plate 1300. In the present embodiment, since the moving unit 1200 is always lifted upward when it is not driven, noise generation due to the user's shaking can be minimized.

FIGS. 21 and 22 are diagrams for explaining a tilt about an x-axis of a reflective member driving device according to the present embodiment.

In the present embodiment, the holder 1210 may be disposed between an upper plate and a lower plate of the housing 1110 in an initial state in which current is not supplied to the first drive unit 1410. At this time, the holder 1210 may be in contact with an upper plate of the housing 1110 (refer to FIG. 21).

At this time, when a current is applied to the first coil 1412 in a first direction, the holder 1210 may be tilted downward about the second protrusion 1320 of the moving plate 1300 due to electromagnetic interaction between the first coil 1412 and the first driving magnet 1411 (refer to θ in FIG. 22).

That is, a current is applied to the first coil 1412 so that the holder 1210 can be tilted downward about an x-axis against the housing 1110. At this time, since the reflective member 1220 along with the holder 1210 is also tilted, the optical path can be changed to cancel out the shaking detected by the gyro sensor 1150.

In the present embodiment, only the current in a first direction may be used to control the first coil 1412 and the current in a second direction opposite to the first direction may not be used. Through this, the separation problem of the moving plate 1300 that may occur when current in the second direction is applied to the first coil 1412 can be fundamentally inhibited. In a modified embodiment, the current in a first direction may be used to control the first coil 1412, and the current in a second direction opposite to the first direction may be used in a smaller amount. Only an extremely small amount of current in a second direction can be used. Or, the current in a second direction for the first coil 1412 may not be used during driving but may be used for other reasons such as maintaining posture.

In more detail, as a comparative example, when the centers of the first magnet 1240 and the second magnet 1120 are disposed at the same height as the second protrusion 1320 of the moving plate 1300, and when the attractive force between the first magnet 1240 and the second magnet 1120 and the electromagnetic force between the first coil 1412 and the first driving magnet 1411 are uneven, the moving unit 1200 may slip due to the electromagnetic force causing separation of the moving plate 1300. When the electromagnetic force between the first coil 1412 and the first driving magnet 1411 is greater than the attractive force between the first magnet 1240 and the second magnet 1120, the moving plate 1300 may be separated. This may cause poor Hall calibration dynamics.

In the present embodiment, the center axis of the attractive force and the center axis of the x-axis drive may be offset by a certain distance. Through this, the reflective member 1220 can be mechanically shifted upward. At this time, the upward direction may be opposite to the direction of the gravity.

In the present embodiment, it can be controlled by code rather than current control. In a pivot structure like the present embodiment, it is difficult to know the initial position in an open state for reasons such as deflection due to gravity, so a closed method (a method in which the moving unit 1200 is in contact with the stationary unit 1100 in an initial state) may be required. In the present embodiment, since it is controlled with a closed method, more precise driving can be performed. Furthermore, in the present embodiment, noise being generated as the moving unit 1200 moves around can be minimized by the closed method.

FIGS. 23 to 25 are diagrams for explaining a tilt about a y-axis of a reflective member driving device according to present embodiment.

In the present embodiment, the holder 1210 may be disposed between both sides of the housing 1110 in an initial state in which current is not supplied to the second drive unit 1420. At this time, the holder 1210 may be spaced apart from both sides of the housing 1110 (refer to FIG. 23).

At this time, when a current in the first direction is applied to the second coil 1422, the holder 1210 can be tilted to one side about the first protrusion 1310 of the moving plate 1300 by electromagnetic interaction between the second coil 1422 and the second driving magnet 1421 (refer to a in FIG. 24).

Meanwhile, when a current in a second direction opposite to a first direction is applied to the second coil 1422, the holder 1210 may be tilted to the other side about the first protrusion 1310 of the moving plate 1300 by electromagnetic interaction between the second coil 1422 and the second driving magnet 1421 (refer to b in FIG. 25).

That is, current is selectively applied to the second coil 1422 in both directions so that the holder 1210 can be tilted in a left and right direction against the housing 1110 about a y-axis. At this time, since the reflective member 1220 along with the holder 1210 is also tilted, the optical path can be changed to cancel out the shaking detected by the gyro sensor 1150. Therefore, in the present embodiment, handshake correction for x-axis tilt and y-axis tilt, that is, two-axis tilt can be performed.

Hereinafter, a lens driving device according to the present embodiment will be described with reference to the drawings.

FIG. 26 is a perspective view of a lens driving device according to the present embodiment; FIG. 27 is a perspective view in which some components of a lens driving device according to the present embodiment are omitted; FIG. 28 is a perspective view of a lens driving device illustrated in FIG.

27 when viewed from another direction; FIG. 29 is a perspective view in which some components of a lens driving device according to the present embodiment are omitted; FIG. 30 is a perspective view of a state in which components such as a substrate and a coil are omitted in a lens driving device according to the present embodiment; FIG. 31 is a perspective view of a state in which a first lens and related components are omitted from the lens driving device illustrated in FIG. 30; FIG. 32 is a perspective view and a partially enlarged view of some components of a lens driving device according to the present embodiment; FIG. 33 is a diagram for explaining an arrangement structure of a coil and a sensor of a lens driving device according to the present embodiment; FIG. 34 is a perspective view of a state in which a second housing is omitted from the lens driving device illustrated in FIG. 30; FIG. 35 is a perspective view of a state in which a guide rail is omitted from the lens driving device illustrated in FIG. 34; FIG. 36 is an enlarged view of some components of a lens driving device according to the present embodiment; FIG. 37 is a perspective view of a first moving unit and a second moving unit and related components of a lens driving device according to the present embodiment; FIG. 38 is a perspective view of a second moving unit and related components of a lens driving device according to the present embodiment; FIG. 39 is an exploded perspective view of a lens driving device according to the present embodiment; FIG. 40 is a perspective view of a second housing of a lens driving device according to the present embodiment; FIGS. 41 and 42 are exploded perspective views of some components of a lens driving device according to the present embodiment; and FIG. 43 is a cross-sectional view of a lens driving device according to this embodiment.

The lens driving device 2000 may perform a zoom function. The lens driving device 2000 may perform a continuous zoom function. The lens driving device 2000 may perform an auto focus (AF) function. The lens driving device 2000 may move the lens. The lens driving device 2000 may move the lens along an optical axis. The lens driving device 2000 may move lenses formed in pluralities of groups for each group. The lens driving device 2000 may move a second group lens. The lens driving device 2000 may move a third group lens. The lens driving device 2000 may be a lens actuator. The lens driving device 2000 may be an AF actuator. The lens driving device 2000 may be a zoom actuator. The lens driving device 2000 may comprise a voice coil motor (VCM).

The lens driving device 2000 may comprise a lens. Or, the lens may be described as one component of the camera device 10 rather than a component of the lens driving device 2000. The lens may be disposed in an optical path formed by the reflective member 1220 of the reflective member driving device 1000 and the image sensor 3400. A lens may comprise pluralities of lenses. The pluralities of lenses may form pluralities of groups. The lenses can form three groups. The lenses may comprise first to third group lenses. A first group lens, a second group lens, and a third group lens may be sequentially disposed between the reflective member 1220 and the image sensor 3400. The first group lens may comprise a first lens 2120. The second group lens may comprise a second lens 2220. The third group lens may comprise a third lens 2320.

The lens driving device 2000 may comprise a stationary unit 2100. The stationary unit 2100 may be a relatively fixed part when the first moving unit 2200 and a second moving unit 2300 move.

The lens driving device 2000 may comprise a housing 2110. The stationary unit 2100 may comprise a housing 2110. The housing 2110 may be disposed outside the first holder 2210 and the second holder 2310. The housing 2110 may accommodate at least a portion of the first holder 2210 and the second holder 2310. The housing 2110 may comprise a front plate, a rear plate, and pluralities of connecting plates. At this time, the front plate is referred to as an upper plate, the rear plate is referred to as a lower plate, and the connecting plate is referred to as a side plate.

The housing 2110 may comprise a first housing 2110-1. The first housing 2110-1 may form a front plate of the housing 2110. The first housing 2110-1 may be coupled to the first lens 2120. The first housing 2110-1 may be a cover. The first housing 2110-1 may be coupled to the reflective member driving device 1000. The first lens 2120 may be fixed to the first housing 2110-1.

The housing 2110 may comprise a second housing 2110-2. The second housing 2110-2 may form a connection plate with a rear plate of the housing 2110. The second housing 2110-2 may be opened forward. The first housing 2110-1 may be coupled to the front of the second housing 2110-2. A portion of a guide rail 2130 may be disposed between the first housing 2110-1 and the second housing 2110-2.

The housing 2110 may comprise a first groove 2111. The first groove 2111 may be coupled to the housing 1110 of the reflective member driving device 1000. The first groove 2111 may be formed in a shape corresponding to the protruding portion of the reflective member driving device 1000. An adhesive that couples the reflective member driving device 1000 to the lens driving device 2000 may be disposed in the first groove 2111.

The housing 2110 may comprise a second groove 2112. The second groove 2112 may be coupled to the housing 1110 of the reflective member driving device 1000. The protrusion of the reflective member driving device 1000 may be inserted into the second groove 2112. The second groove 2112 may be formed in a shape corresponding to the protrusion of the reflective member driving device 1000. An adhesive for coupling the reflective member driving device 1000 to the lens driving device 2000 may be disposed in the second groove 2112.

The housing 2110 may comprise a first hole 2113. The first hole 2113 may expose the protrusion 2211 of the first holder 2210 and the protrusion 2311 of the second holder 2310. The first hole 2113 may be formed in a connection plate of the housing 2110. In the test stage during manufacturing, it is possible to check whether the lens driving device 2000 is normally operating by checking the protrusion 2211 of the first holder 2210 and the protrusion 2311 of the second holder 2310 being exposed through the first hole 2113.

The housing 2110 may comprise a plate 2113-1. The plate 2113-1 may cover the first hole 2113. The plate 2113-1 may be disposed in the first hole 2113 to close the first hole 2113.

The housing 2110 may comprise a second hole 2114. The second hole 2114 may be a coil accommodating hole in which the first coil 2412 and the second coil 2422 are disposed. A first coil 2412 and a second coil 2422 may be disposed in the second hole 2114. The second hole 2114 may be larger than the first coil 2412 and the second coil 2422.

The housing 2110 may comprise a protrusion 2115. The protrusion 2115 may be formed in the second housing 2110-2. The protrusion 2115 may be formed as a two-stage protrusion. The protrusion 2115 may be coupled with the guide rail 2130. The protrusion 2115 may be coupled to the first housing 2110-1. The guide rail 2130 may be coupled to a portion of the protrusion 2115 having a large diameter and the first housing 2110-1 may be coupled to a portion of the protrusion 2115 having a small diameter.

The protrusion 2115 may comprise a first protrusion 2115-1. The first protrusion 2115-1 may comprise a first portion having a first diameter D2 and a second portion being protruded from the first portion and having a second diameter D1. The protrusion 2115 may comprise a second protrusion 2115-2. The second protrusion 2115-2 may comprise a third portion having a third diameter D3 and a fourth portion being protruded from the third portion and having a fourth diameter D4. At this time, the fourth diameter D4 may be smaller than the second diameter D1. Through this, the first protrusion 2115-1 may be more tightly coupled to the first housing 2110-1 than the second protrusion 2115-2.

The housing 2110 may comprise a guide protrusion 2116. The guide protrusion 2116 may be formed on an inner surface of the housing 2110. The guide protrusion 2116 may be formed in a shape corresponding to the shape of at least a portion of the first holder 2210 and the second holder 2310. Through this, the guide protrusion 2116 may guide the movement of the first holder 2210 and the second holder 2310 in an optical axis direction. At this time, the optical axis direction may be a z-axis direction perpendicular to the x-axis and the y-axis. The guide protrusion 2116 may be disposed in an optical axis direction. The guide protrusion 2116 may be extended in an optical axis direction.

The housing 2110 may comprise a groove 2117. The groove 2117 may be formed in the first housing 2110-1. The groove 2117 of the first housing 2110-1 may be coupled with the protrusion 2115 of the second housing 2110-2.

The housing 2110 may comprise a protrusion 2118. The protrusion 2118 may be coupled to a substrate 2140. The protrusion 2118 may be inserted into a groove of the substrate 2140. The protrusion 2118 may be formed in a size and shape corresponding to the groove of the substrate 2140.

The housing 2110 may comprise a vent hole 2119. The vent hole 2119 may be formed in a rear plate of the housing 2110. The vent hole 2119 may form a gap between the housing 2110 and the dummy glass 2600. Air may flow into the gap between the housing 2110 and the dummy glass 2600. Gas generated during the curing process of the adhesive may escape through the vent hole 2119.

The lens driving device 2000 may comprise a first lens 2120. Or, the first lens 2120 may be described as a component of the camera device 10 rather than a component of the lens driving device 2000. The stationary unit 2100 may comprise a first lens 2120. The first lens 2120 may be disposed on an optical axis. The first lens 2120 may be disposed between the reflective member 1220 and the image sensor 3400. The first lens 2120 may be disposed between the reflective member 1220 and the second lens 2220. The first lens 2120 may be disposed inside the first housing 2110-1. The first lens 2120 may be fixed to the first housing 2110-1. The first lens 2120 may maintain a fixed state even when the second lens 2220 and the third lens 2320 move.

The first lens 2120 may be a first group lens. The first lens 2120 may comprise pluralities of lenses. The first lens 2120 may comprise three lenses.

The lens driving device 2000 may comprise a guide rail 2130. The stationary unit 2100 may comprise a guide rail 2130. The guide rail 2130 may be coupled between the first housing 2110-1 and the second housing 2110-2. The guide rail 2130 may guide the movement of the first holder 2210 and the second holder 2310. The rail 2130 may guide the first holder 2210 and the second holder 2310 to move in an optical axis direction. The guide rail 2130 may comprise a rail being disposed in an optical axis direction. The guide rail 2130 may comprise a rail being extended in an optical axis direction. The guide rail 2130 may comprise a rail on which the ball 2500 rolls.

The lens driving device 2000 may comprise a substrate 2140. The stationary unit 2100 may comprise a substrate 2140. The substrate 2140 may be disposed on both side surfaces of the housing 2110. The substrate 2140 may be a FPCB. A first coil 2412 and a second coil 2422 may be disposed in the substrate 2140.

The substrate 2140 may comprise a first region 2140-1. The first region 2140-1 may be formed at an end of the substrate 2140. A terminal may be disposed in the first region 2140-1. The substrate 2140 may comprise a second region 2140-2. The first region 2140-1 of the substrate 2140 may be bent inward with respect to the second region 2140-2. Through this, it is possible to minimize the size of the printed circuit board 3300 while securing a soldering arrangement region connecting the terminals of the board 2140 and the printed circuit board 3300. The first region 2140-1 may form an obtuse angle with the second region 2140-2.

The substrate 2140 may comprise a first substrate 2141. The first substrate 2141 may be disposed at one side of the housing 2110. A first coil 2412 may be disposed in the first substrate 2141. First and second Hall sensors 2413 and 2414 may be disposed in the first substrate 2141.

The substrate 2140 may comprise a second substrate 2142. The second substrate 2142 may be disposed at the other side of the housing 2110. The second substrate 2142 may be disposed at an opposite side of the first substrate 2141. A second coil 2422 may be disposed in the second substrate 2142. Third and fourth Hall sensors 2423 and 2424 may be disposed in the second substrate 2142.

The lens driving device 2000 may comprise a SUS 2145. The SUS 2145 may be disposed on substrate 2140. The SUS 2145 may reinforce the strength of the substrate 2140. The SUS 2145 may dissipate heat generated from the substrate 2140.

The lens driving device 2000 may comprise an EEPROM 2150. The EEPROM 2150 may be electrically connected to the first coil 2412 and the second coil 2422. The EEPROM 2150 may be used to control currents applied to the first coil 2412 and the second coil 2422 before connecting the lens driving device 2000 to a driver IC 3900 in the manufacturing process. That is, the EEPROM 2150 may be used to test whether the lens driving device 2000 normally operates. The EEPROM 2150 may be disposed on an inner surface of substrate 2140.

The lens driving device 2000 may comprise a first moving unit 2200. The first moving unit 2200 may move against the stationary unit 2100. At least a portion of the first moving unit 2200 may be disposed between the stationary unit 2100 and the second moving unit 2300. The first moving unit 2200 may move between the stationary unit 2100 and the second moving unit 2300.

The lens driving device 2000 may comprise a first holder 2210. The first moving unit 2200 may comprise a first holder 2210. The first holder 2210 may be disposed inside the housing 2110. The first holder 2210 may move against the housing 2110. At least a portion of the first holder 2210 may be spaced apart from the housing 2110. The first holder 2210 may be in contact with the housing 2110. The first holder 2210 may come into contact with the housing 2110 during moving. Or, the first holder 2210 may be in contact with the housing 2110 in an initial state.

The first holder 2210 may comprise a protrusion 2211. The protrusion 2211 may be a test protrusion. The protrusion 2211 may be formed on an outer surface of the first holder 2210. The protrusion 2211 may be protruded from the first holder 2210. The protrusion 2211 may be visible from the outside through the first hole 2113 of the housing 2110. The protrusion 2211 may be used during testing whether the lens driving device 2000 operates normally. The protrusion 2211 may comprise a plane 2211-1 and an inclined surface 2211-2.

The first holder 2210 may comprise a rail groove 2212. A ball 2500 may be disposed in the rail groove 2212. The ball 2500 may move by rolling in the rail groove 2212. The rail groove 2212 and the ball 2500 may be in contact with each other at two points. The rail groove 2212 may be disposed in an optical axis direction. The rail groove 2212 may be extended in an optical axis direction.

The rail groove 2212 may comprise pluralities of rail grooves. The rail groove 2212 may comprise four rail grooves. The rail groove 2212 may comprise first to fourth rail grooves. One or more balls 2500 may be disposed in each of the pluralities of rail grooves 2212.

The first holder 2210 may comprise a protrusion 2213. The protrusion 2213 may be formed on a surface of the first holder 2210 facing the first housing 2110-1. The protrusion 2213 may come into contact with the first housing 2110-1 when the first holder 2210 moves in a direction being closer to the first housing 2110-1. At this time, compared to the case where the protrusion 2213 is omitted, the contact area between the first holder 2210 and the first housing 2110-1 can be reduced when the protrusion 2213 is formed. Through this, shock and noise generated due to contact between the first holder 2210 and the first housing 2110-1 can be minimized.

The lens driving device 2000 may comprise a second lens 2220. Or, the second lens 2220 may be described as a component of the camera device 10 rather than a component of the lens driving device 2000. The first moving unit 2200 may comprise a second lens 2220. The second lens 2220 may be disposed on an optical axis. The second lens 2220 may be disposed between the reflective member 1220 and the image sensor 3400. The second lens 2220 may be disposed between the first lens 2120 and the third lens 2320. The second lens 2220 may be disposed inside the first holder 2210. The second lens 2220 may be coupled to the first holder 2210. The second lens 2220 may be fixed to the first holder 2210. The second lens 2220 may move against the first lens 2120. The second lens 2220 may move separately from the third lens 2320.

The second lens 2220 may be a second group lens. The second lens 2220 may comprise pluralities of lenses. The second lens 2220 may comprise two lenses.

The lens driving device 2000 may comprise a second moving unit 2300. The second moving unit 2300 may move against the stationary unit 2100. The second moving unit 2300 may move separately from the first moving unit 2200. The second moving unit 2300 may be disposed at a rear of the first moving unit 2200. The second moving unit 2300 may move in a direction being closer to and being farther away from the first moving unit 2200.

The lens driving device 2000 may comprise a second holder 2310. The second moving unit 2300 may comprise a second holder 2310. The second holder 2310 may be disposed inside the housing 2110. The second holder 2310 may move against the housing 2110. At least a portion of the second holder 2310 may be spaced apart from the housing 2110. The second holder 2310 may be in contact with the housing 2110. The second holder 2310 may come into contact with the housing 2110 during moving. Or, the second holder 2310 may be in contact with the housing 2110 in an initial state. The second holder 2310 may be in contact with the first holder 2210. The second holder 2310 may be spaced apart from the first holder 2210. The second holder 2310 may come into contact with the first holder 2210 during moving. Or, the second holder 2310 may be in contact with the first holder 2210 in an initial state.

The second holder 2310 may comprise a protrusion 2311. The protrusion 2311 may be a test protrusion. The protrusion 2311 may be formed on an outer surface of the second holder 2310. The protrusion 2311 may be protruded from the second holder 2310. The protrusion 2311 may be visible from the outside through the first hole 2113 of the housing 2110. The protrusion 2311 may be used during testing whether the lens driving device 2000 operates normally. The protrusion 2311 may comprise a flat surface 2311-1 and an inclined surface 2311-2.

The second holder 2310 may comprise a rail groove 2312. A ball 2500 may be disposed in the rail groove 2312. The ball 2500 may move by rolling in the rail groove 2312. The rail groove 2312 and the ball 2500 may be in contact with each other at two points. The rail groove 2312 may be disposed in an optical axis direction. The rail groove 2312 may be extended in an optical axis direction.

The rail groove 2312 may comprise pluralities of rail grooves. The rail groove 2312 may comprise four rail grooves. The rail groove 2312 may comprise first to fourth rail grooves. One or more balls 2500 may be disposed in each of the plurality of rail grooves 2312.

The second holder 2310 may comprise a protrusion 2313. The protrusion 2313 may be formed on a surface of the second holder 2310 facing the first holder 2210. The protrusion 2313 may come into contact with the first holder 2210 when the second holder 2310 moves in a direction being closer to the first holder 2210. At this time, compared to the case where the protrusion 2313 is omitted, the contact area between the second holder 2310 and the first holder 2210 can be reduced when the protrusion 2313 is formed. Through this, impact and noise being generated due to the contact between the second holder 2310 and the first holder 2210 can be minimized.

The lens driving device 2000 may comprise a third lens 2320. Or, the third lens 2320 may be described as a component of the camera device 10 rather than a component of the lens driving device 2000. The second moving unit 2300 may comprise a third lens 2320. The third lens 2320 may be disposed on an optical axis. The third lens 2320 may be disposed between the reflective member 1220 and the image sensor 3400. The third lens 2320 may be disposed between the second lens 2220 and the image sensor 3400. The third lens 2320 may be disposed inside the second holder 2310. The third lens 2320 may be coupled to the second holder 2310. The third lens 2320 may be fixed to the second holder 2310. The third lens 2320 may move against the first lens 2120. The third lens 2320 may move separately from the second lens 2220.

The third lens 2320 may be a third group lens. The third lens 2320 may comprise pluralities of lenses. The third lens 2320 may comprise two lenses.

The lens driving device 2000 may comprise a drive unit 2400. The drive unit 2400 may move at least some of the plurality of lenses. The drive unit 2400 may move the first moving unit 2200 and the second moving unit 2300 against the stationary unit 2100. The drive unit 2400 may comprise a coil and a magnet. The drive unit 2400 may move the first moving unit 2200 and the second moving unit 2300 through electromagnetic interaction. As a modified embodiment, the drive unit 2400 may comprise a shape memory alloy.

The drive unit 2400 may comprise a first drive unit 2410. The first drive unit 2410 may move the first moving unit 2200 against the stationary unit 2100. The first drive unit 2410 may move the first moving unit 2200 against the second moving unit 2300. The first drive unit 2410 may be used to drive a zoom function. Or, the first drive unit 2410 may be used to drive an auto focus function.

The first drive unit 2410 may comprise a first driving magnet 2411. The first driving magnet 2411 may be disposed in the first holder 2210. The first driving magnet 2411 may be disposed on a side surface of the first holder 2210. The first driving magnet 2411 may be coupled to the first holder 2210. The first driving magnet 2411 may be fixed to the first holder 2210. The first driving magnet 2411 may be fixed to the first holder 2210 by an adhesive. The first driving magnet 2411 may move integrally with the first holder 2210. The first driving magnet 2411 may be disposed to face the first coil 2412. The first driving magnet 2411 may face the first coil 2412. The first driving magnet 2411 may be disposed at a position corresponding to the first coil 2412. The first driving magnet 2411 may interact with the first coil 2412. The first driving magnet 2411 may interact with the first coil 2412 electromagnetically.

The first driving magnet 2411 may comprise a first magnet portion 2411-1. The first magnet portion 2411-1 may have a first polarity. The first driving magnet 2411 may comprise a second magnet portion 2411-2. The second magnet portion 2411-2 may have a second polarity different from the first polarity. At this time, the first polarity may be an N pole and the second polarity may be an S pole. Conversely, the first polarity may be an S pole and the second polarity may be an N pole.

The first driving magnet 2411 may comprise a neutral portion 2411-3. The neutral portion 2411-3 may be disposed between the first magnet portion 2411-1 and the second magnet portion 2411-2. The neutral portion 2411-3 may have a neutral polarity. The neutral portion 2411-3 may be a non-magnetized portion.

The first drive unit 2410 may comprise a first coil 2412. The first coil 2412 may be disposed in the substrate 2140. The first coil 2412 may be disposed in the first substrate 2141.

The first coil 2412 may be disposed in the housing 2110. The first coil 2412 may be disposed outside the first holder 2210. When a current is applied to the first coil 2412, an electromagnetic field is formed around the first coil 2412 and can interact with the first driving magnet 2411.

As a modified embodiment, the first coil 2412 may be disposed in the first holder 2210 and the first driving magnet 2411 may be disposed in the housing 2110.

The first coil 2412 may be formed in a ring shape. The first coil 2412 may be formed as a square ring or a circular ring. Even when the first coil 2412 is formed in a square ring shape, the corner portion may be formed to be curved. The first coil 2412 may comprise a first portion 2412-1 and a second portion 2412-2 having a gap G1 therebetween. First and second Hall sensors 2413 and 2414 may be disposed in the gap G1 of the first coil 2412.

The lens driving device 2000 may comprise a Hall sensor. The Hall sensor may detect the first driving magnet 2411. The Hall sensor may comprise pluralities of Hall sensors. The Hall sensor may comprise a first Hall sensor 2413 and a second Hall sensor 2414. The first Hall sensor 2413 and the second Hall sensor 2414 may be spaced apart from each other. The first Hall sensor 2413 and the second Hall sensor 2414 may be spaced apart such that a gap G2 is formed therebetween. The first Hall sensor 2413 and the second Hall sensor 2414 may detect the first driving magnet 2411. The first Hall sensor 2413 and the second Hall sensor 2414 may detect the magnetic force of the first driving magnet 2411. The first Hall sensor 2413 and the second Hall sensor 2414 may detect the position of the first holder 2210. The first Hall sensor 2413 and the second Hall sensor 2414 may detect the position of the second lens 2220.

The lens driving device 2000 may comprise a yoke 2415. The yoke 2415 may be disposed between the first driving magnet 2411 and the first holder 2210. The yoke 2415 may be formed in a shape corresponding to that of the first driving magnet 2411. The yoke 2415 may increase the interaction force between the first driving magnet 2411 and the first coil 2412.

The yoke 2415 may comprise an extended portion 2415-1. The extended portion 2415-1 may cover the front and rear surfaces of the first driving magnet 2411. The yoke 2415 may comprise a groove 2415-2. The groove 2415-2 may be formed in the central portion of the body portion of the yoke 2415.

The drive unit 2400 may comprise a second drive unit 2420. The second drive unit 2420 may move the second moving unit 2300 against the stationary unit 2100. The second drive unit 2420 may move the second moving unit 2300 against the first moving unit 2200. The second drive unit 2420 may be used to drive an auto focus function. Or, the second drive unit 2420 may be used to drive a zoom function.

The second drive unit 2420 may comprise a second driving magnet 2421. The second driving magnet 2421 may be disposed in the second holder 2310. The second driving magnet 2421 may be disposed on a side surface of the second holder 2310. The second driving magnet 2421 may be coupled to the second holder 2310. The second driving magnet 2421 may be fixed to the second holder 2310. The second driving magnet 2421 may be fixed to the second holder 2310 by an adhesive. The second driving magnet 2421 may move integrally with the second holder 2310. The second driving magnet 2421 may be disposed to face the second coil 2422. The second driving magnet 2421 may face the second coil 2422. The second driving magnet 2421 may be disposed at a position corresponding to the second coil 2422. The second driving magnet 2421 may interact with the second coil 2422. The second driving magnet 2421 may interact with the second coil 2422 electromagnetically.

The second drive unit 2420 may comprise a second coil 2422. The second coil 2422 may be disposed in the substrate 2140. The second coil 2422 may be disposed in the second substrate 2142. The second coil 2422 may be disposed in the housing 2110. The second coil 2422 may be disposed outside the second holder 2310. When a current is applied to the second coil 2422, an electromagnetic field is formed around the second coil 2422 and can interact with the second driving magnet 2421.

As a modified embodiment, the second coil 2422 may be disposed in the second holder 2310 and the second driving magnet 2421 may be disposed in the housing 2110.

The lens driving device 2000 may comprise a Hall sensor. The Hall sensor may detect the second driving magnet 2421. The Hall sensor may comprise pluralities of Hall sensors. The Hall sensor may comprise a third Hall sensor 2423 and a fourth Hall sensor 2424. The third Hall sensor 2423 and the fourth Hall sensor 2424 may be spaced apart from each other. The third Hall sensor 2423 and the fourth Hall sensor 2424 may be spaced apart such that a gap G2 is formed therebetween. The third Hall sensor 2423 and the fourth Hall sensor 2424 may detect the second driving magnet 2421. The third Hall sensor 2423 and the fourth Hall sensor 2424 may detect the magnetic force of the second driving magnet 2421. The third Hall sensor 2423 and the fourth Hall sensor 2424 may detect the position of the second holder 2310. The third Hall sensor 2423 and the fourth Hall sensor 2424 may detect the position of the third lens 2320.

The lens driving device 2000 may comprise a yoke 2425. The yoke 2425 may be disposed between the second driving magnet 2421 and the second holder 2310. The yoke 2425 may be formed in a shape corresponding to that of the second driving magnet 2421. The yoke 2425 may increase the interaction force between the second driving magnet 2421 and the second coil 2422.

The lens driving device 2000 may comprise a first yoke 2430. The first yoke 2430 may be disposed so that an attractive force acts between the first driving magnet 2411 and the first yoke 2430. The first yoke 2430 may be disposed in the housing 2110. The first yoke 2430 may be disposed in the substrate 2140. The first yoke 2430 may be disposed in the first substrate 2141. The first holder 2210 may press the ball 2500 toward the guide rail 2130 by the attractive force between the first driving magnet 2411 and the first yoke 2430. That is, the ball 2500 may be maintained between the first holder 2210 and the guide rail 2130 without being separated by the attractive force between the first driving magnet 2411 and the first yoke 2430.

The lens driving device 2000 may comprise a second yoke 2440. The second yoke 2440 may be disposed so that attractive force acts between the second driving magnet 2421 and the second yoke 2440. The second yoke 2440 may be disposed in the housing 2110. The second yoke 2440 may be disposed in the substrate 2140. The second yoke 2440 may be disposed in the second substrate 2142. The second holder 2310 may press the ball 2500 toward the guide rail 2130 by the attractive force between the second driving magnet 2421 and the second yoke 2440. That is, the ball 2500 may be maintained between the second holder 2310 and the guide rail 2130 without being detached by the attractive force between the second driving magnet 2421 and the second yoke 2440.

The lens driving device 2000 may comprise a ball 2500. The ball 2500 may guide the movement of the first holder 2210. The ball 2500 may be disposed between the first holder 2210 and the guide rail 2130. The ball 2500 may guide the movement of the second holder 2310. The ball 2500 may be disposed between the second holder 2310 and the guide rail 2130. The ball 2500 may be formed in a spherical shape. The ball 2500 may roll the rail groove 2212 of the first holder 2210 and the rail 2133 of the guide rail 2130. The ball 2500 may roll in an optical axis direction between the rail groove 2212 of the first holder 2210 and the rail 2133 of the guide rail 2130. The ball 2500 may roll the rail groove 2312 of the second holder 2310 and the rail 2133 of the guide rail 2130. The ball 2500 may move in an optical axis direction between the rail groove 2312 of the second holder 2310 and the rail 2133 of the guide rail 2130. The ball 2500 may comprise pluralities of balls. A total of 8 balls 2500 may be provided: 4 balls in the first holder 2210; and 4 balls in the second holder 2310.

The lens driving device 2000 may comprise a dummy glass 2600. The dummy glass 2600 may be disposed in the housing 2110. The dummy glass 2600 may close the rear opening of the housing 2110. The dummy glass 2600 may be transparent to allow light to pass therethrough.

The lens driving device 2000 may comprise a poron 2700. The poron 2700 may be an impact absorbing member. The poron 2700 can minimize impact and noise being generated by movement of the first holder 2210 and the second holder 2310. The poron 2700 may be disposed at a portion where the first holder 2210 collides with the housing 2110. The poron 2700 may be disposed at a portion where the second holder 2310 collides with the housing 2110.

FIGS. 44 to 46 are views for explaining implementation of a zoom function and an autofocus function of a lens driving device according to the present embodiment.

In the present embodiment, in an initial state in which current is not supplied to the drive unit 2400, the first lens 2120, the second lens 2220, and the third lens 2320 may be disposed in alignment with the optical axis OA (refer to FIG. 44).

At this time, when a current is applied to the first coil 2412, the second lens 2220 moves along an optical axis OA due to the electromagnetic interaction between the first coil 2412 and the first driving magnet 2411 (refer to a in FIG. 58). As the second lens 2220 moves while the first lens 2120 is fixed, a zoom function may be performed. When a current in a first direction is applied to the first coil 2412, the second lens 2220 may move in a direction being closer to the first lens 2120. When a current in a second direction which is opposite to the first direction is applied to the first coil 2412, the second lens 2220 may move in a direction being farther away from the first lens 2120.

Meanwhile, when a current is applied to the second coil 2422, the third lens 2320 may move along an optical axis OA due to electromagnetic interaction between the second coil 2422 and the second driving magnet 2421 (refer to b in FIG. 46). An auto focus (AF) function may be performed by relative movement of the third lens 2320 against the first lens 2120 and the second lens 2220. When a current in a first direction is applied to the second coil 2422, the third lens 2320 may move in a direction being closer to the first lens 2120. When a current in a second direction which is opposite to the first direction is applied to the second coil 2422, the third lens 2320 may move in a direction being farther away from the first lens 2120.

Hereinafter, a camera device according to the present embodiment will be described with reference to drawings.

Figure 1:
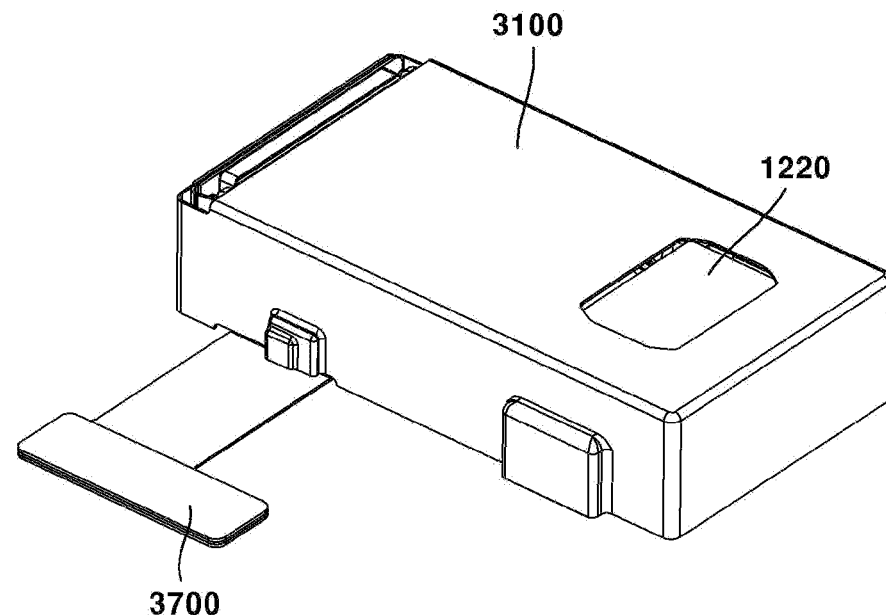
FIG. 1 is a perspective view of a camera device according to the present embodiment.
Figure 2:
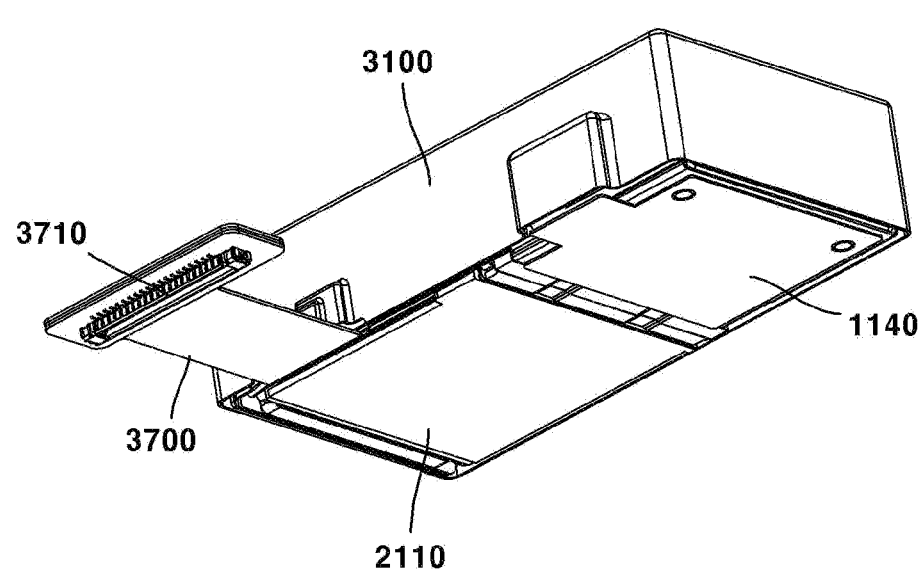
FIG. 2 is a bottom perspective view of a camera device according to the present embodiment.
Figure 3:
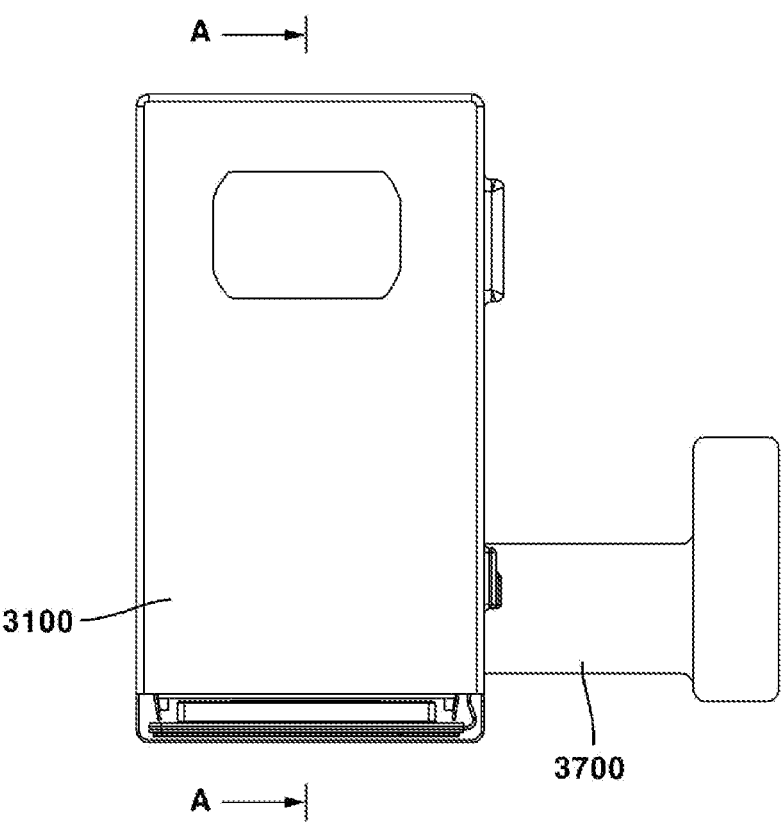
FIG. 3 is a plan view of a camera device according to the present embodiment.
Figure 4:
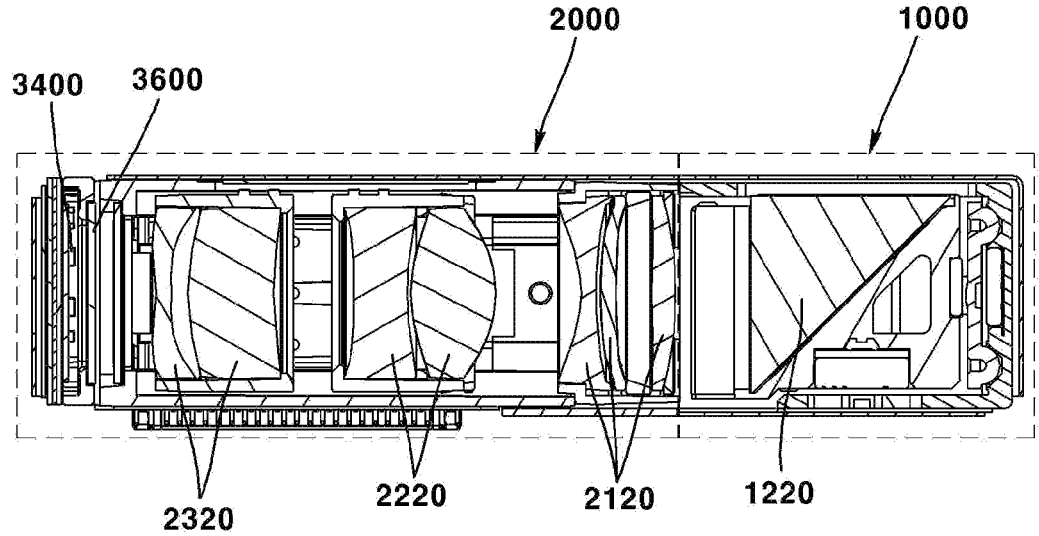
FIG. 4 is a cross-sectional view seen from A-A in FIG. 3.
Figure 5:
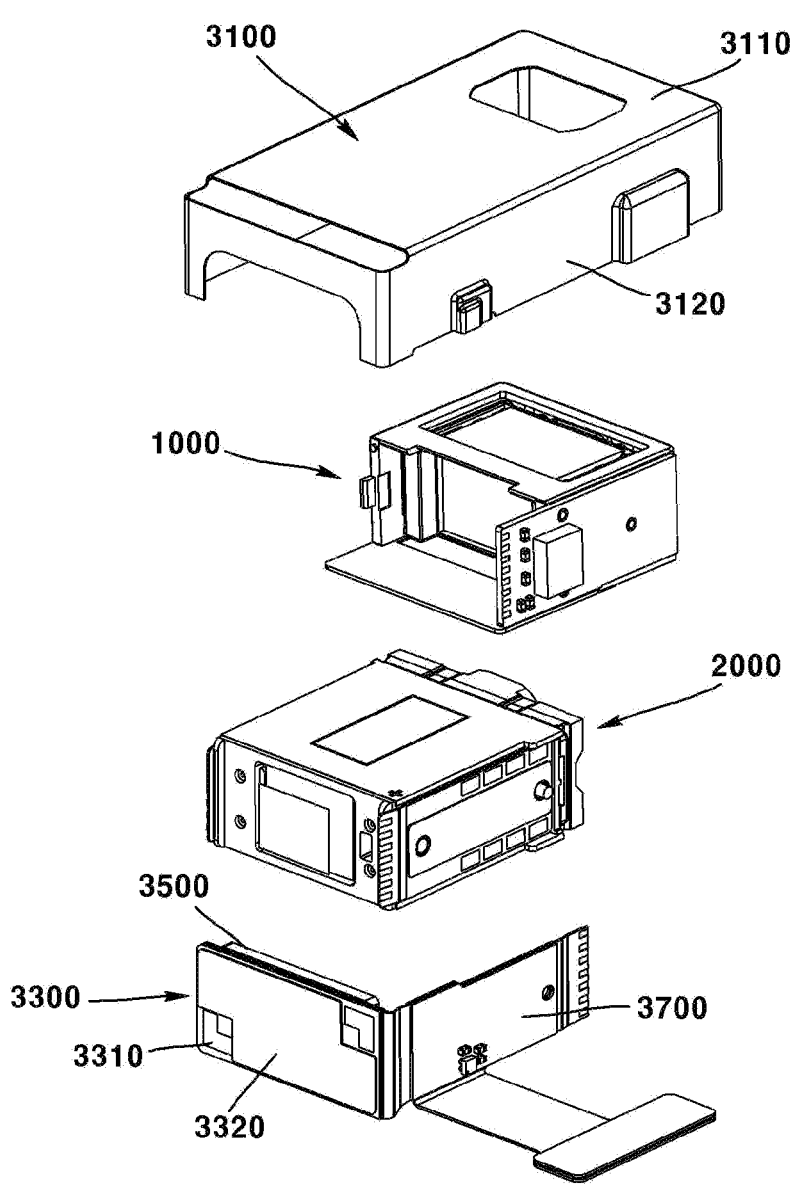
FIG. 5 is an exploded perspective view of the camera device according to the present embodiment.

FIG. 1 is a perspective view of a camera device according to the present embodiment; FIG. 2 is a bottom perspective view of a camera device according to the present embodiment; FIG. 3 is a plan view of a camera device according to the present embodiment; FIG. 4 is a cross-sectional view seen from A-A in FIG. 3; FIG. 5 is an exploded perspective view of the camera device according to the present embodiment; FIG. 47 is a perspective view of some components of a camera device according to the present embodiment; and FIG. 48 is an exploded perspective view of an image sensor and a filter and related components of a camera device according to the present embodiment.

The camera device 10 may comprise a cover member 3100. The cover member 3100 may be a 'cover can' or a 'shield can'. The cover member 3100 may be disposed to cover the reflective member driving device 1000 and the lens driving device 2000. The cover member 3100 may be disposed outside the reflective member driving device 1000 and the lens driving device 2000. The cover member 3100 may cover the reflective member driving device 1000 and the lens driving device 2000. The cover member 3100 may accommodate the reflective member driving device 1000 and the lens driving device 2000. The cover member 3100 may be formed of a metal material. The cover member 3100 may block electromagnetic interference (EMI).

The cover member 3100 may comprise an upper plate 3110. The upper plate 3110 may comprise an opening or hole. Light may be incident through an opening or hole of the upper plate 3110. The opening or hole of the upper plate 3110 may be formed at a position corresponding to that of the reflective member 1220.

The cover member 3100 may comprise a side plate 3120. The side plate 3120 may comprise pluralities of side plates. The side plate 3120 may comprise four side plates. The side plate 3120 may comprise first to fourth side plates. The side plate 3120 may comprise first and second side plates being disposed at an opposite side to each other, and third and fourth side plates being disposed at an opposite side to each other.

The camera device 10 may comprise a printed circuit board 3300 (PCB). The printed circuit board 3300 may be a substrate or a circuit board. A sensor base 3500 may be disposed in the printed circuit board 3300. The printed circuit board 3300 may be electrically connected to the reflective member driving device 1000 and the lens driving device 2000. The printed circuit board 3300 may comprise various circuits, elements, and control units to convert an image formed by the image sensor 3400 into an electrical signal and transmit the converted electrical signal to an external device.

The printed circuit board 3300 may comprise a marking portion 3310. The marking portion 3310 may be disposed on a rear surface of the printed circuit board 3300.

The camera device 10 may comprise a SUS 3320. The SUS 3320 may be disposed on a rear surface of the printed circuit board 3300. The SUS 3320 may reinforce the strength of the printed circuit board 3300. The SUS 3320 may dissipate heat being generated in the printed circuit board 3300.

The camera device 10 may comprise an image sensor 3400. The image sensor 3400 may be disposed in the printed circuit board 3300. Light passing through the lens and the filter 3600 may be incident on the image sensor 3400 to form an image. The image sensor 3400 may be electrically connected to the printed circuit board 3300. For an example, the image sensor 3400 may be coupled to the printed circuit board 3300 by a surface mounting technology (SMT). As another example, the image sensor 3400 may be coupled to the printed circuit board 3300 using a flip chip technology. The image sensor 3400 may be disposed such that an optical axis coincides with a lens. An optical axis of the image sensor 3400 and an optical axis of the lens may be aligned. The image sensor 3400 may convert light irradiated onto an effective image region of the image sensor 3400 into an electrical signal. The image sensor 3400 may comprise one or more among a charge coupled device (CCD), a metal oxide semi-conductor (MOS), a CPD, and a CID.

The camera device 10 may comprise a sensor base 3500. The sensor base 3500 may be disposed in the printed circuit board 3300. A filter 3600 may be disposed in the sensor base 3500. An opening may be formed in a portion of the sensor base 3500 where the filter 3600 is disposed so that light passing through the filter 3600 may be incident to the image sensor 3400.

The camera device 10 may comprise a filter 3600. The filter 3600 may serve to block light of a specific frequency band from entering the image sensor 3400 from light passing through the lens. The filter 3600 may be disposed between the lens and the image sensor 3400. The filter 3600 may be disposed in the sensor base 3500. The filter 3600 may comprise an infrared filter. The infrared filter may block light of an infrared region from being incident on the image sensor 3400.

The camera device 10 may comprise a substrate 3700. The substrate 3700 may be connected to the printed circuit board 3300. The substrate 3700 may be extended from the printed circuit board 3300. The substrate 3700 may comprise terminals electrically connected to the reflective member driving device 1000. The substrate 3700 may comprise an extended portion being extended outward.

The camera device 10 may comprise a connector 3710. The connector 3710 may be disposed in substrate 3700. The connector 3710 may be disposed on a lower surface of the extended portion of the substrate 3700. For an example, the connector 3710 may be connected to a power supply unit of a smart phone.

The camera device 10 may comprise a temperature sensor 3800. The temperature sensor 3800 may detect temperature. The temperature detected by the temperature sensor 3800 may be used for more accurate control of one or more among the handshake correction function, the auto focus function, and the zoom function.

The camera device 10 may comprise a driver IC 3900. The driver IC 3900 may be electrically connected to the lens driving device 2000. The driver IC 3900 may be described as one component of the lens driving device 2000. The driver IC 3900 may be electrically connected to the first coil 2412 and the second coil 2422 of the lens driving device 2000. The driver IC 3900 may supply current to the first coil 2412 and the second coil 2422 of the lens driving device 2000. The driver IC 3900 may control at least one of voltage or current applied to each of the first coil 2412 and the second coil 2422 of the lens driving device 2000. The driver IC 3900 may be electrically connected to the Hall sensors 2413, 2414, 2423, and 2424. The driver IC 3900 may control the feedback of the voltage and current applied to the first coil 2412 and the second coil 2422 through the positions of the second lens 2220 and the third lens 2320 detected by the Hall sensors 2413, 2414, 2423, and 2424.

Hereinafter, an optical device according to the present embodiment will be described with reference to drawings.

FIG. 49 is a perspective view of the front of the optical device according to the present embodiment; and FIG. 50 is a perspective view of the rear of the optical device according to the present embodiment.

The optical device 1 may comprise any one or more among a hand phone, a portable phone, a portable terminal, a mobile terminal, a smart phone, a smart pad, a portable smart device, a digital camera, a laptop computer, a digital broadcasting terminal, and personal digital assistants (PDAs), portable multimedia player (PMP), and navigation. The optical device 1 may comprise any device for photographing videos or photos.

The optical device 1 may comprise a main body 20. The optical device 1 may comprise a camera device 10. The camera device 10 may be disposed in the main body 20. The camera device 10 may photograph a subject. The optical device 1 may comprise a display 30. The display 30 may be disposed in the main body 20. The display 30 may output any one or more of videos and images photographed by the camera device 10. The display 30 may be disposed at a first surface of the main body 20. The camera device 10 may be disposed on at least one of a first surface of the main body 20 and a second surface at an opposite side of the first surface.

The camera device 10 according to the present embodiment may be a folded camera module. The folded camera module may have an angle of view of 15 degrees to 40 degrees. The folded camera module may have a focal length of 18 mm to 20 mm or more. The folded camera module may be used as a rear camera of the optical device 1. A main camera having an angle of view of 70 degrees to 80 degrees may be disposed on a rear surface of the optical device 1. At this time, the folded camera can be placed next to the main camera. That is, the camera device 10 according to the present embodiment may be applied to any one or more of pluralities of rear cameras of the optical device 1. The camera device 10 according to the present embodiment may be applied to one camera among two, three, four or more of rear cameras of the optical device 1.

Meanwhile, the camera device 10 according to the present embodiment may be disposed at a front side of the optical device 1 as well. However, when the front camera of the optical device 1 is one, a wide-angle camera may be applied. When there are two or more of front cameras of the optical device 1, one of them could be a tele-camera like the present embodiment. However, since the focal length is shorter than that of the rear tele-camera, a normal camera module not equipped with a reflective member other than a folded camera module may be applied.

Although the embodiments of the present invention have been described with reference to the accompanying drawings, those skilled in the art to which the present invention pertains will understand that the present invention can be embodied in other specific forms without changing its technical spirit or essential features. Therefore, the embodiments described above should be understood as illustrative in all respects and not limiting.

What is claimed is:

1. An actuator device comprising:
   a housing;
   a holder disposed in the housing;
   a reflective member disposed on the holder;
   a first drive unit configured to tilt the holder about a first axis;
   a first attractive member disposed on the holder; and
   a second attractive member disposed on the housing and configured to act an attractive force with the first attractive member,
   wherein an imaginary first straight line connecting a center of the first attractive member and a center of the second attractive member is spaced apart from an imaginary second straight line passing through the first axis and parallel with the first straight line.

2. The actuator device of claim 1, wherein light is incident on an upper surface of the reflective member, and
   wherein the first straight line is disposed higher than the second straight line.

3. The actuator device of claim 1, wherein the first straight line is spaced apart from the second straight line in a first direction, and
   wherein the first straight line is overlapped with the second straight line in the first direction.

4. The actuator device of claim 3, comprising a second drive unit configured to tilt the holder about a second axis perpendicular to the first axis.

5. The actuator device of claim 4, wherein the second axis is parallel with the first direction.

6. The actuator device of claim 1, wherein the center of the first attractive member is disposed at a same height as the center of the second attractive member.

7. The actuator device of claim 1, wherein each of the first attractive member and the second attractive member comprises a magnet.

8. The actuator device of claim 1, wherein any one of the first attractive member and the second attractive member comprises a magnet, and the other comprises a metal yoke.

9. The actuator device of claim 1, wherein the first drive unit comprises a first driving magnet and a first coil, and wherein in an initial state when no current is applied to the first coil, the holder is contacted with the housing.

10. The actuator device of claim 9, wherein the housing comprises a first portion disposed above the holder, and wherein, in the initial state, the holder is contacted with the first portion of the housing.

11. The actuator device of claim 9, wherein a first direction drive current is applied to the first coil to tilt the holder, and wherein a second direction drive current opposite to the first direction drive current is not used to tilt the holder.

12. The actuator device of claim 1, comprising a moving plate disposed between the housing and the holder, wherein the moving plate comprises a protrusion disposed on the holder, and wherein the first axis is formed by the protrusion of the moving plate.

13. The actuator device of claim 1, comprising a moving plate disposed between the housing and the holder, wherein the moving plate comprises a hole, wherein the housing comprises a protruding portion protruding toward the holder, and at least a portion of the protruding portion is disposed on the hole of the moving plate, and wherein the second attractive member is disposed on the protruding portion of the housing.

14. A camera device comprising:
a printed circuit board;
an image sensor disposed on the printed circuit board;
the actuator device of claim 1; and
a lens disposed on an optical path formed by the reflective member of the actuator device and the image sensor.

15. An optical device comprising:
a main body;
the camera device of claim 14 disposed on the main body; and
a display disposed on the main body and configured to output at least one of a video and an image photographed by the camera device.

16. An actuator device comprising:
a housing;
a holder disposed in the housing;
a reflective member disposed on the holder;
a first drive unit configured to tilt the holder about a first axis;
a first attractive member disposed on the holder; and
a second attractive member disposed on the housing and configured to act an attractive force with the first attractive member,
wherein in an initial state when no current is applied to the first drive unit, the holder is contacted with the housing.

17. The actuator device of claim 16, wherein the housing comprises a first portion disposed above the holder, and wherein, in the initial state, the holder is contacted with the first portion of the housing.

18. The actuator device of claim 16, wherein an imaginary first straight line connecting a center of the first attractive member and a center of the second attractive member is spaced apart from an imaginary second straight line passing through the first axis and parallel with the first straight line.

19. The actuator device of claim 18, wherein the first straight line is spaced apart from the second straight line in a first direction, and wherein the first straight line is overlapped with the second straight line in the first direction.

20. An actuator device comprising:
a housing;
a holder disposed in the housing;
a reflective member disposed on the holder;
a moving plate disposed between the housing and the holder;
a driving magnet and a first coil configured to tilt the holder about a first axis;
a first magnet disposed on the holder; and
a second magnet disposed on the housing at a position corresponding with the first magnet,
wherein a first surface of the first magnet and a first surface of the second magnet face each other and have different polarities, and
wherein an imaginary first straight line connecting a center of the first magnet and a center of the second magnet is spaced apart from an imaginary second straight line passing through the first axis and parallel with the first straight line.

* * * * *